(12) United States Patent
Tamada

(10) Patent No.: US 10,006,515 B2
(45) Date of Patent: Jun. 26, 2018

(54) IMPACT ENERGY ABSORBER

(71) Applicant: KYORAKU CO., LTD., Kyoto-shi, Kyoto (JP)

(72) Inventor: Teruo Tamada, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 0 days. days.

(21) Appl. No.: 15/023,973

(22) PCT Filed: Sep. 5, 2014

(86) PCT No.: PCT/JP2014/073538
§ 371 (c)(1),
(2) Date: Mar. 22, 2016

(87) PCT Pub. No.: WO2015/045808
PCT Pub. Date: Apr. 2, 2015

(65) Prior Publication Data
US 2016/0215843 A1    Jul. 28, 2016

(30) Foreign Application Priority Data

Sep. 26, 2013  (JP) ................................ 2013-200468
Sep. 26, 2013  (JP) ................................ 2013-200469
(Continued)

(51) Int. Cl.
*F16F 7/12* (2006.01)
*B60R 21/04* (2006.01)
*B60J 5/04* (2006.01)

(52) U.S. Cl.
CPC ............... *F16F 7/12* (2013.01); *B60J 5/0451* (2013.01); *B60R 21/04* (2013.01)

(58) Field of Classification Search
CPC .. F16F 7/12; F16F 7/121; B60R 21/04; B60R 21/0442; B60R 21/0435; B60R 21/0414
(Continued)

(56) References Cited

U.S. PATENT DOCUMENTS 2,275,575 A * 3/1942 Vrooman ........... A47G 27/0412
                                                        428/167
3,852,221 A * 12/1974 Bentley .................. C11D 1/655
                                                        510/429
(Continued)

FOREIGN PATENT DOCUMENTS

DE   102004058249 A1 * 6/2006 ............. B60R 21/04
JP       2004-098774 A     4/2004
(Continued)

OTHER PUBLICATIONS

Nov. 4, 2014 Search Report issued in International Patent Application No. PCT/JP2014/073538.

Primary Examiner — Thomas J Williams
(74) Attorney, Agent, or Firm — Oliff PLC

(57) ABSTRACT

An impact energy absorber with desired absorbing properties while being capable of avoiding the incidence of warpage. The impact energy absorber produced by a formation of a plate-shaped resin material, has a planar portion, and at least one projection projecting from one surface of the planar portion. The planar portion has a plurality of groove-shaped peripheral ribs in an opposite surface at a periphery thereof. The plurality of groove-shaped peripheral rib extends in a direction intersecting with a circumferential direction of the planar portion, and is aligned in the circumferential direction of the planar portion.

12 Claims, 33 Drawing Sheets

(30)   Foreign Application Priority Data

Sep. 26, 2013   (JP) ................................. 2013-200470
Sep. 26, 2013   (JP) ................................. 2013-200491

(58) Field of Classification Search
USPC ............ 188/371, 372, 376, 377; 296/187.03, 296/187.05
See application file for complete search history.

(56)    References Cited

U.S. PATENT DOCUMENTS

| | | | |
|---|---|---|---|
| 4,673,605 A * | 6/1987 | Sias | ................... A61G 7/05707 428/120 |
| 8,443,950 B2 | 5/2013 | Tamada | |
| 2012/0235443 A1 | 9/2012 | Tamada | |

FOREIGN PATENT DOCUMENTS

| | | | |
|---|---|---|---|
| JP | 2006-151250 A | 6/2006 |
| JP | 2012-192794 A | 10/2012 |
| JP | 2013-083310 A | 5/2013 |
| WO | 2008/105517 A1 | 9/2008 |

* cited by examiner

[Fig. 1]
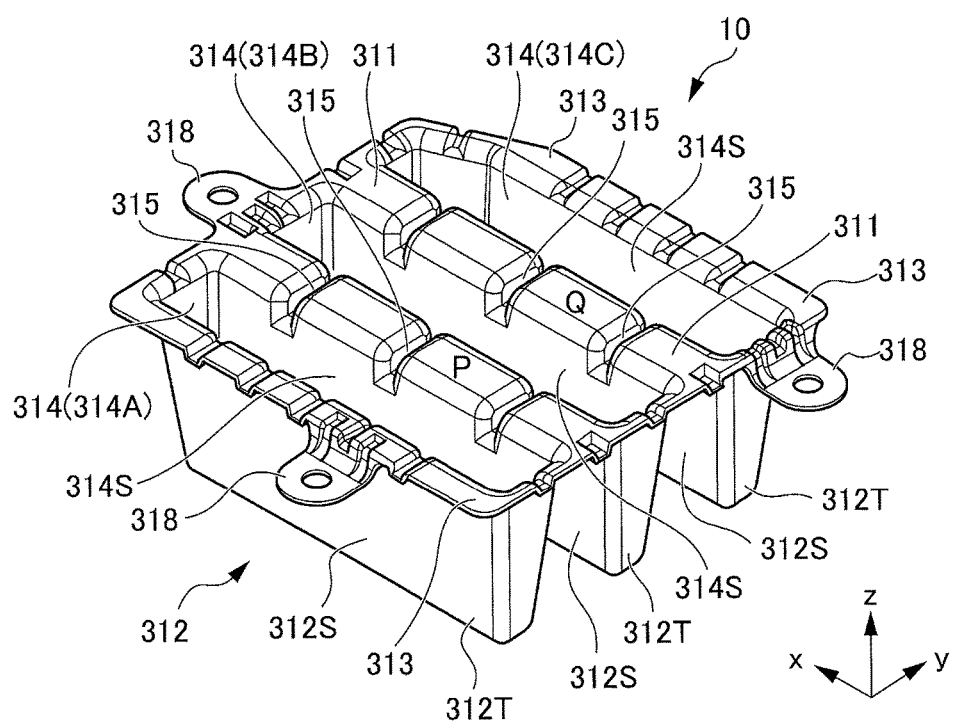

[Fig. 2]
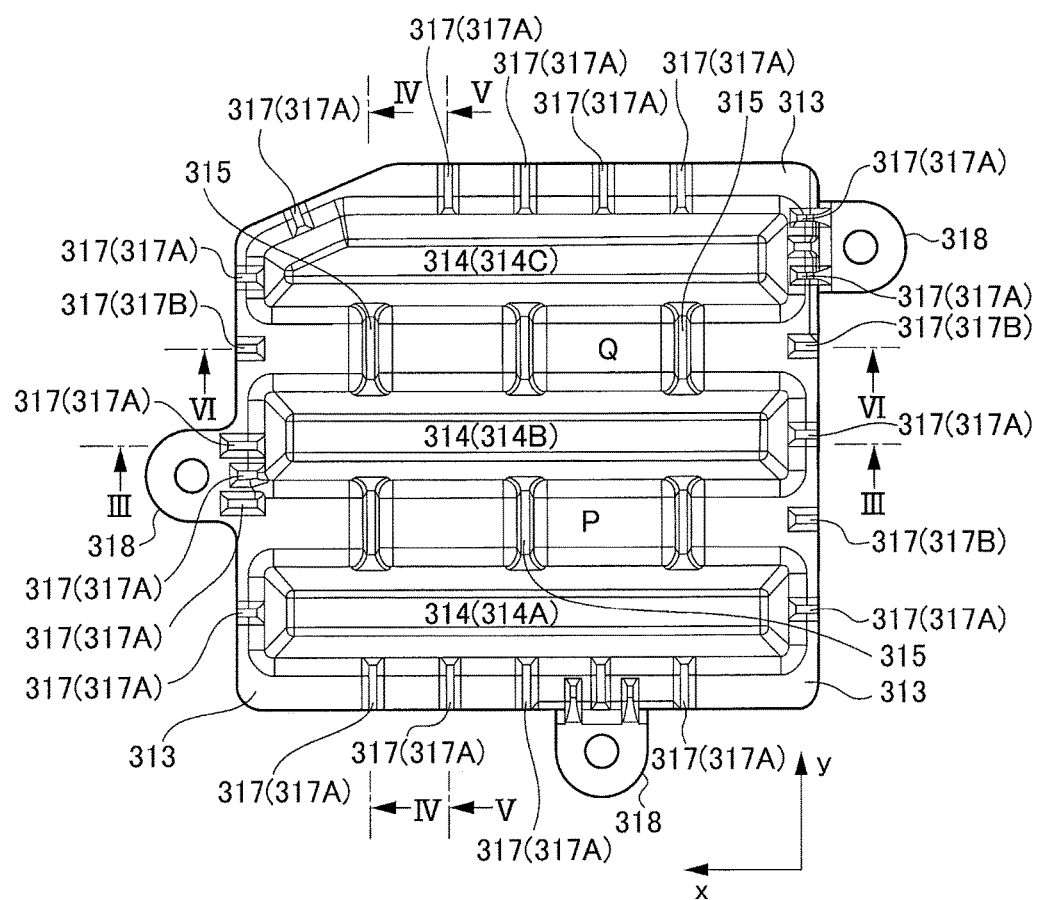

[Fig. 3]
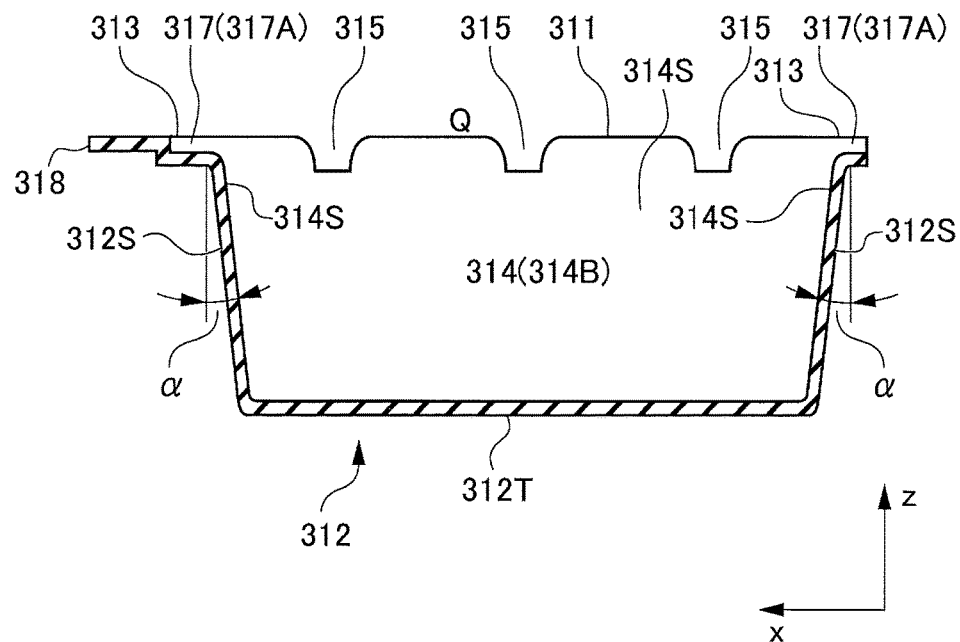
[FIG. 4]
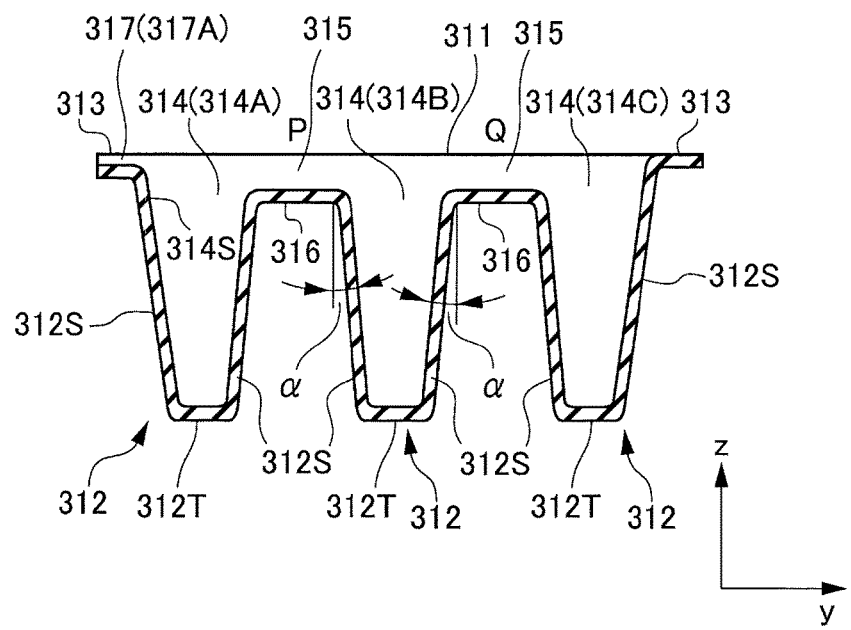

[FIG. 5]
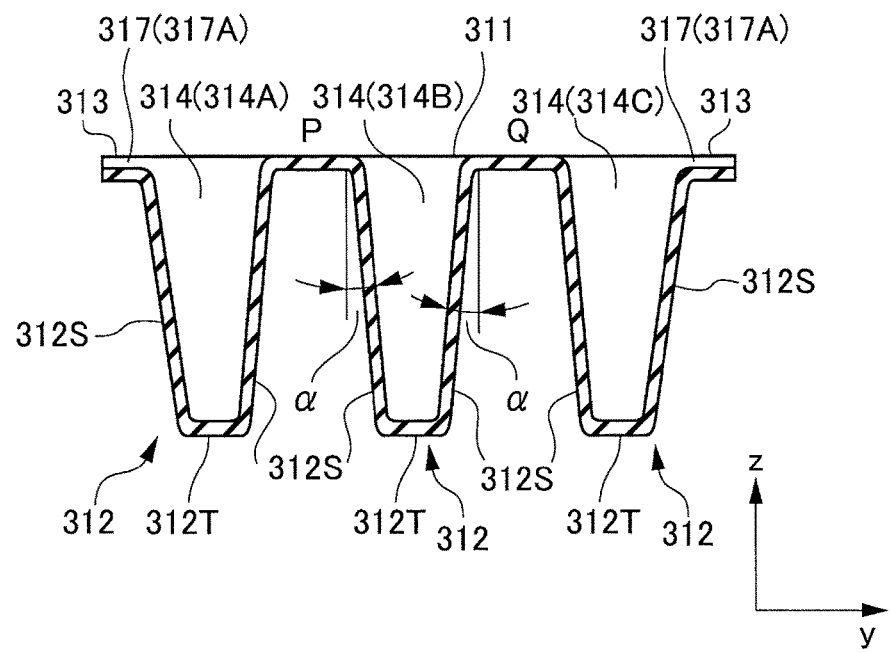
[FIG. 6]
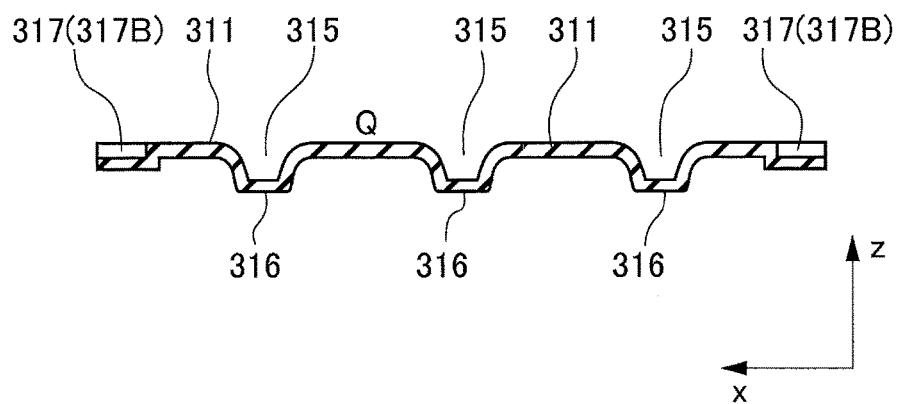

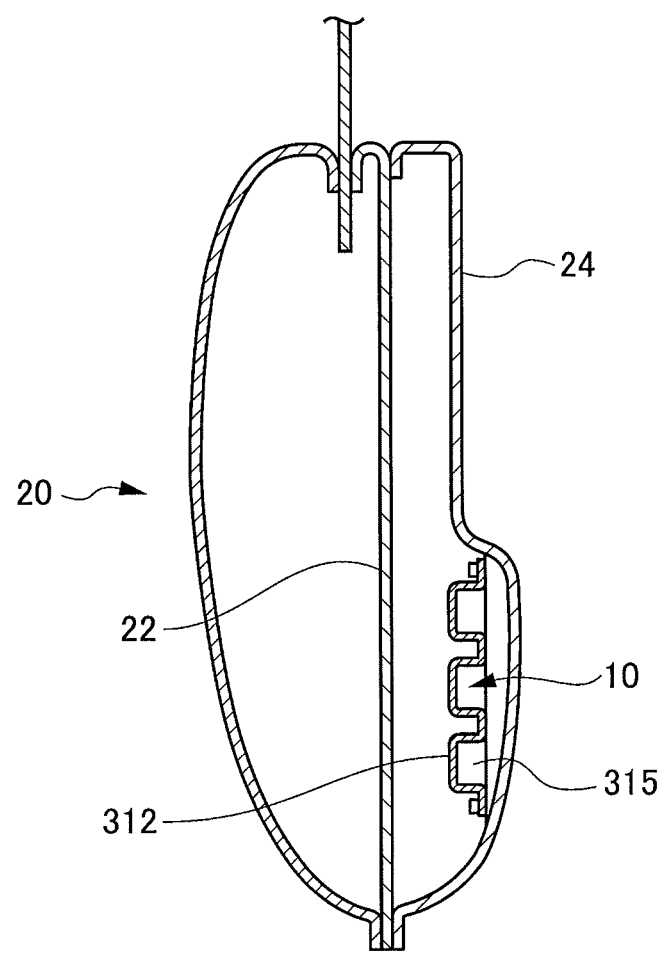
[FIG. 7]

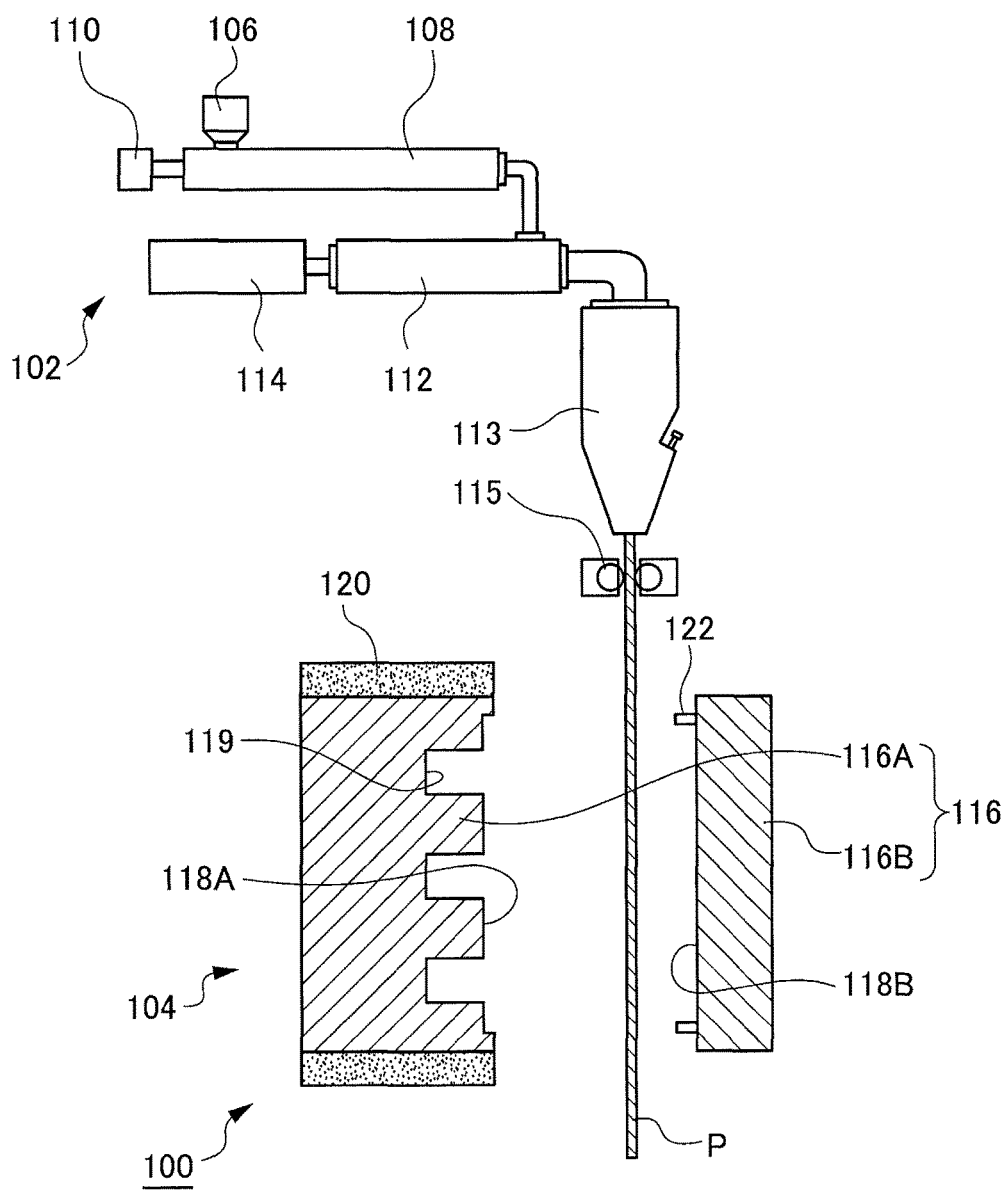
[FIG. 8]

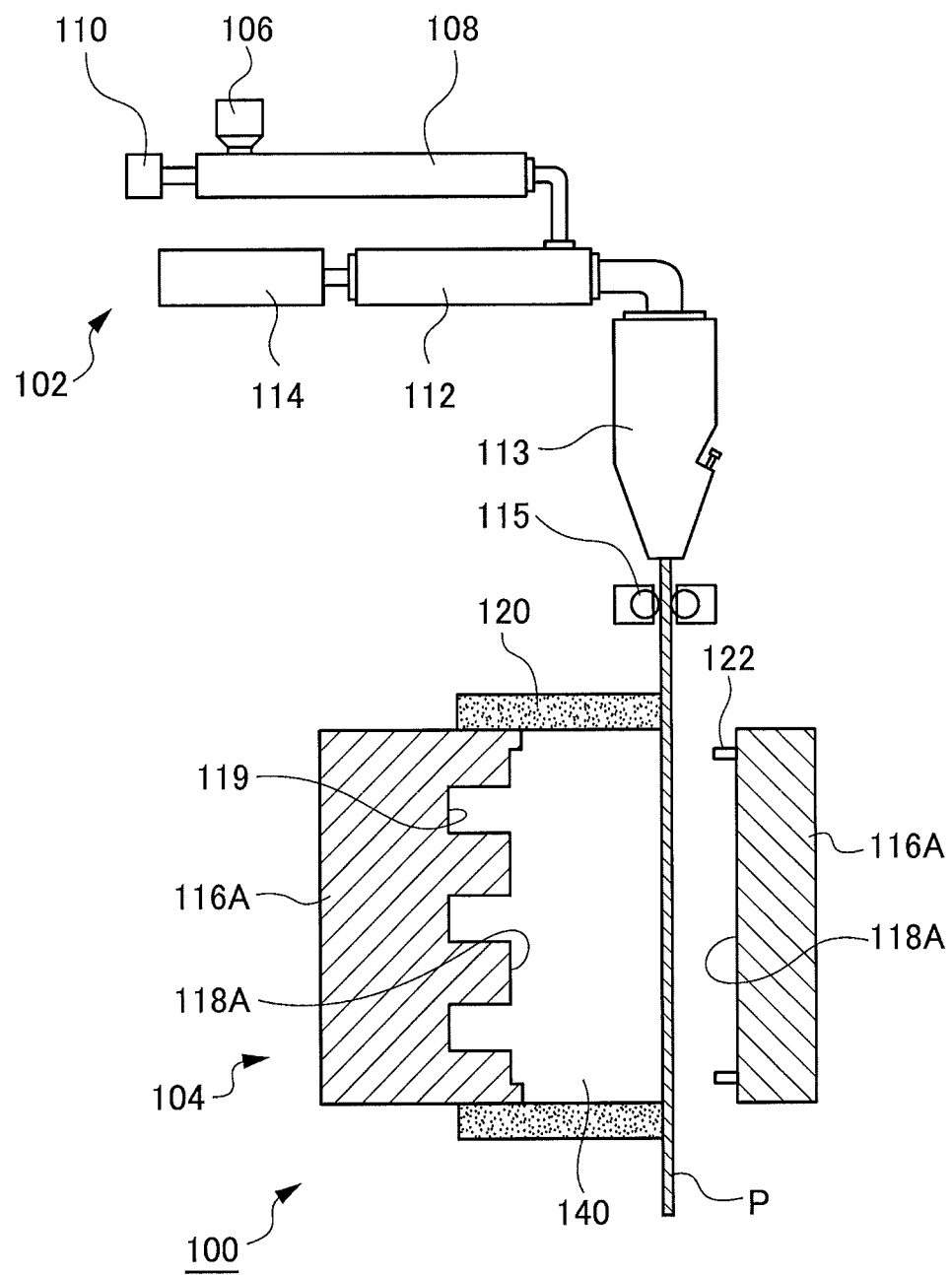
[FIG. 9]

[FIG. 10]
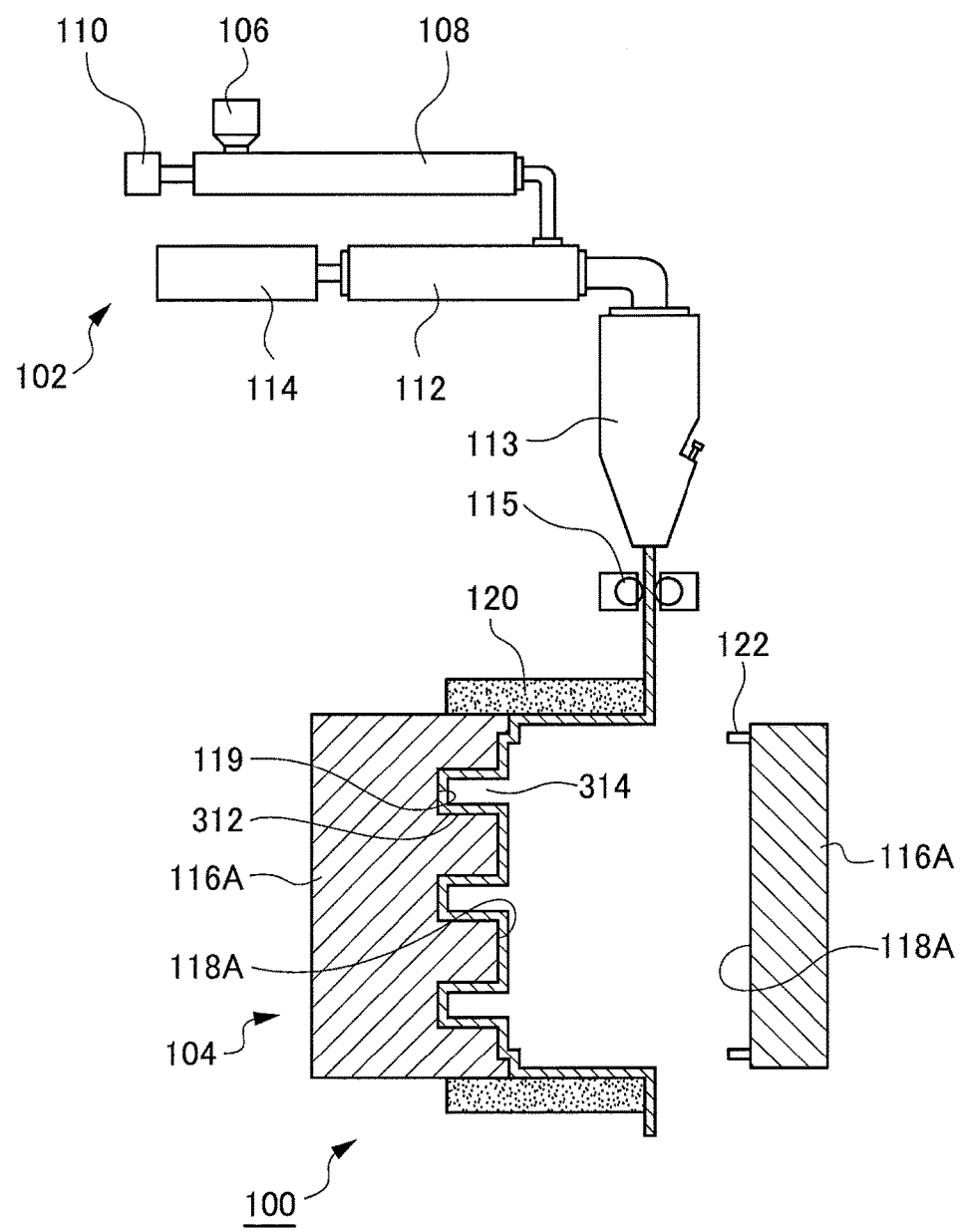

[FIG. 11]
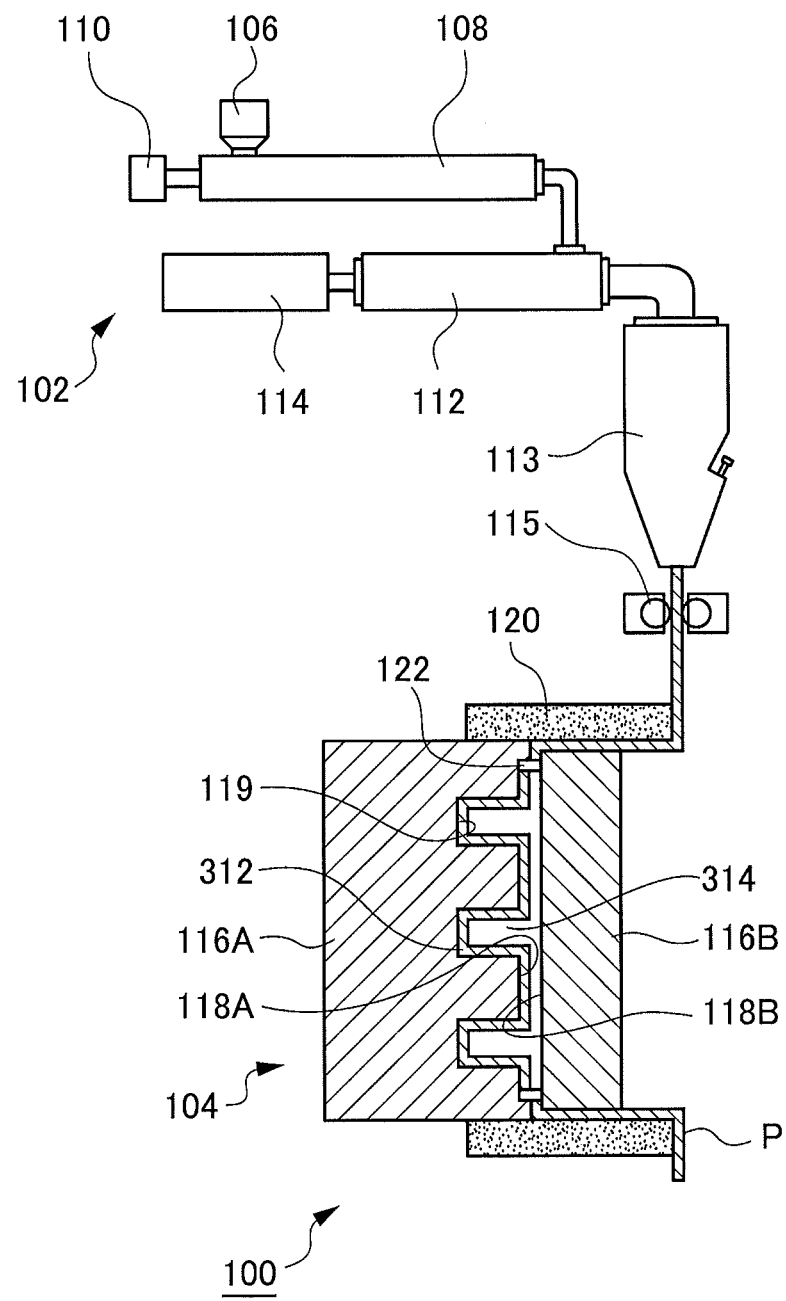

[FIG. 12]
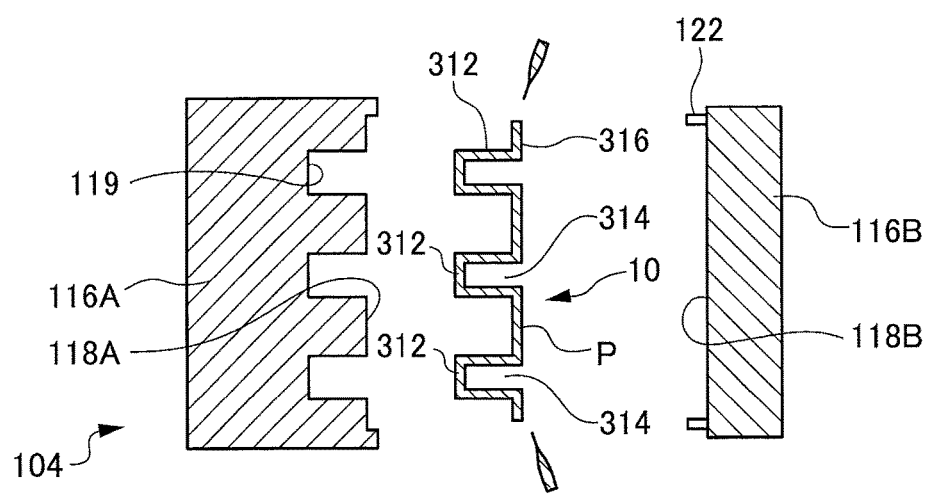

[FIG. 13A]
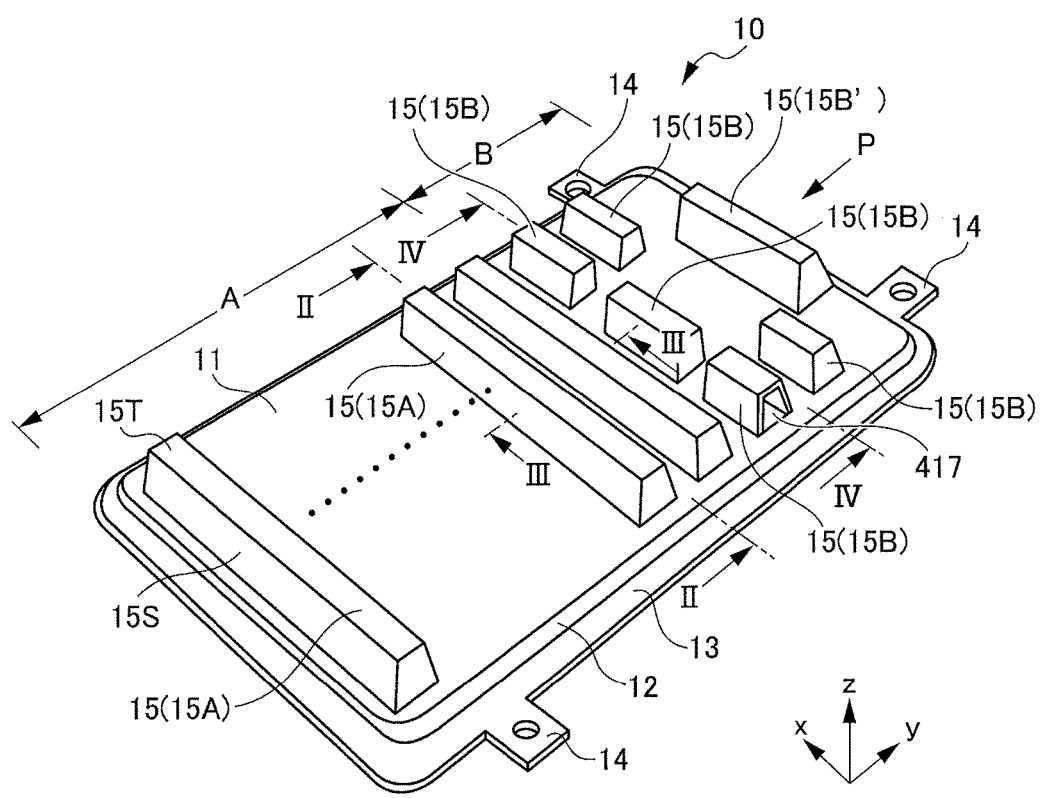

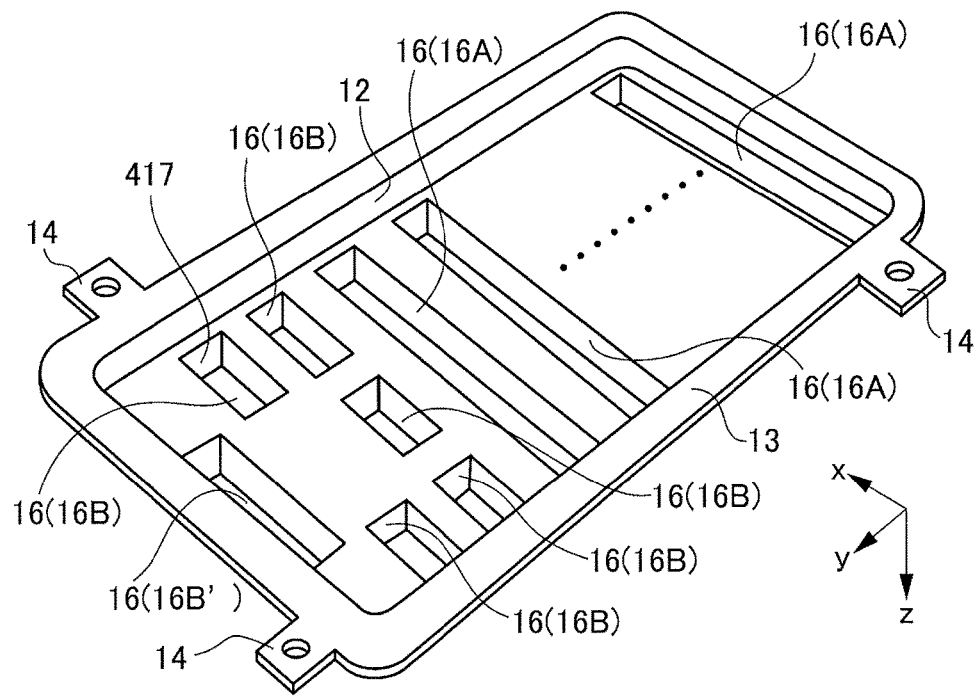
[FIG. 13B]

[FIG. 14]
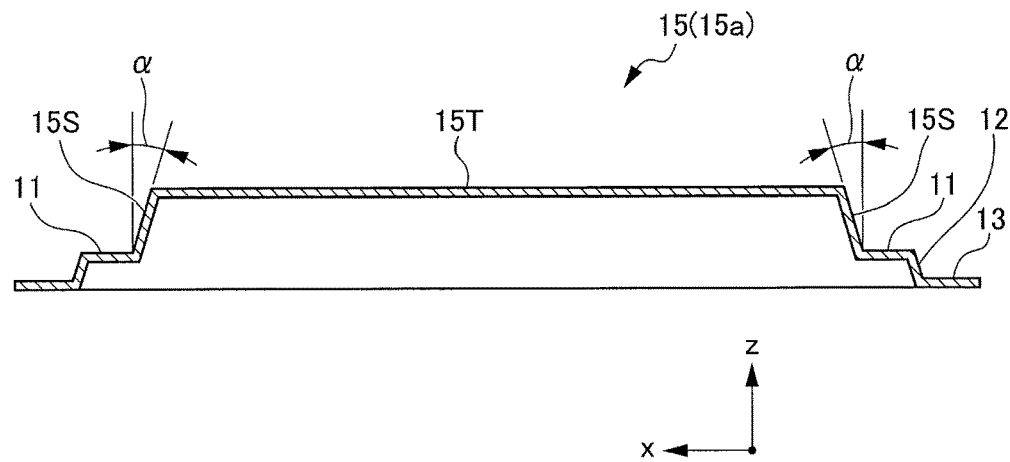
[FIG. 15]
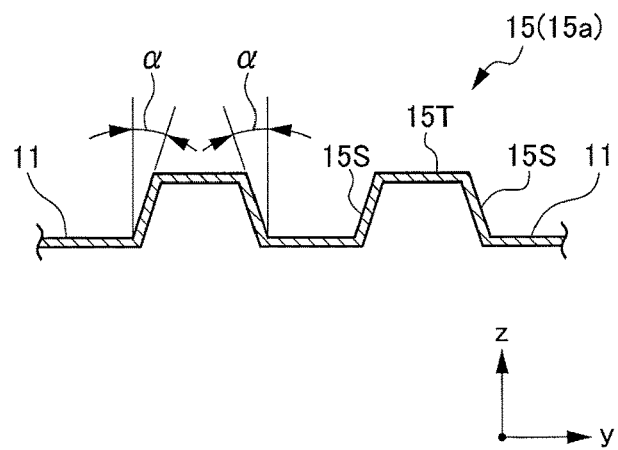
[FIG. 16]
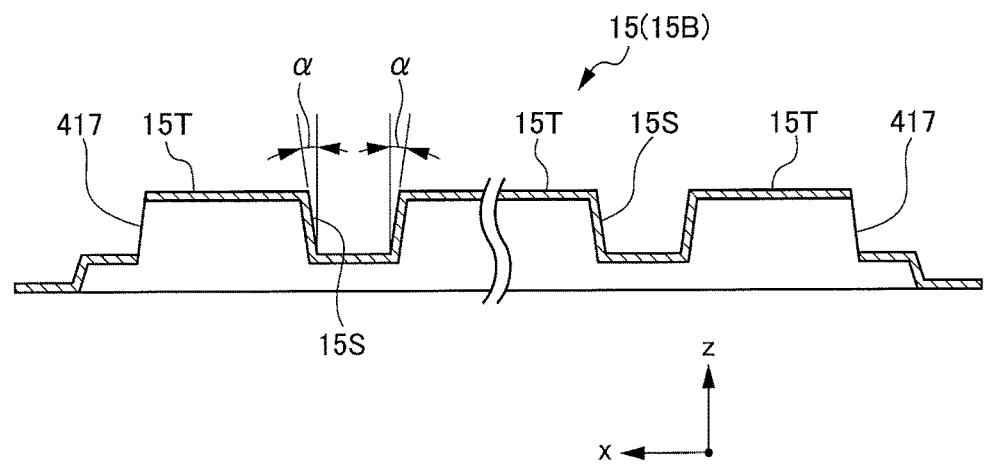

[FIG. 17A]
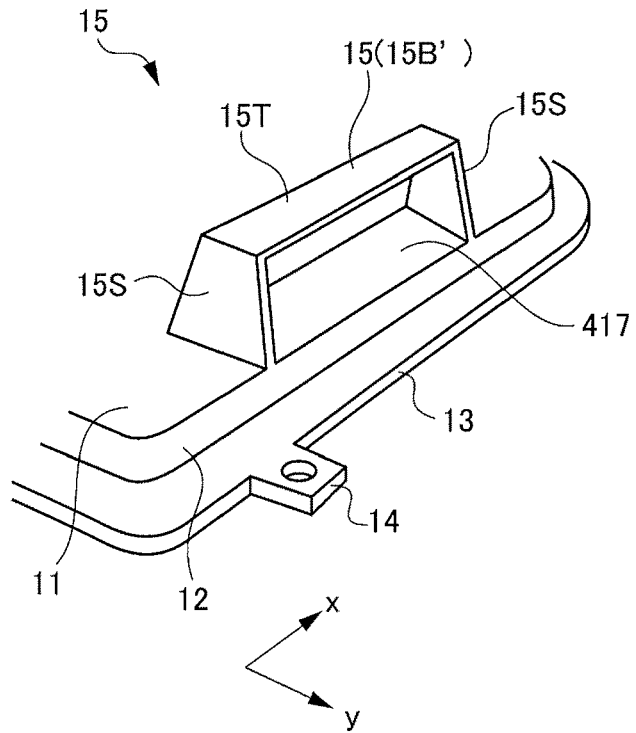
[FIG. 17B]
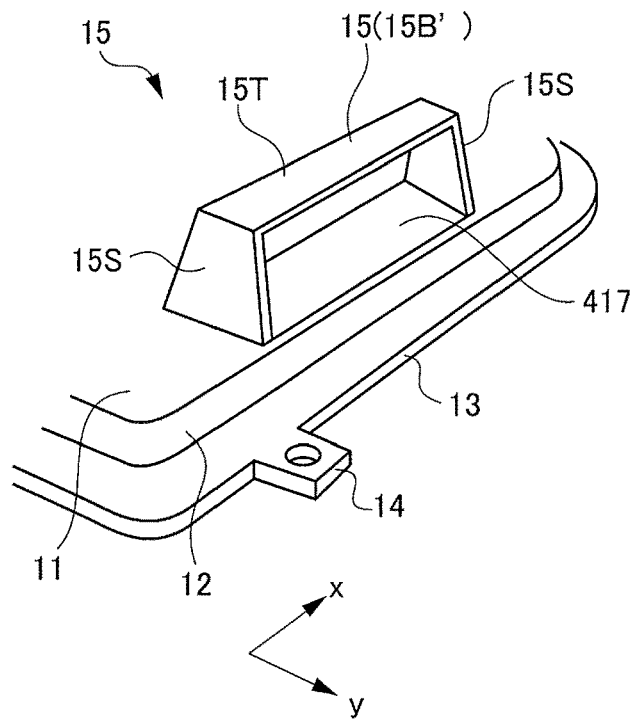

[FIG. 18]
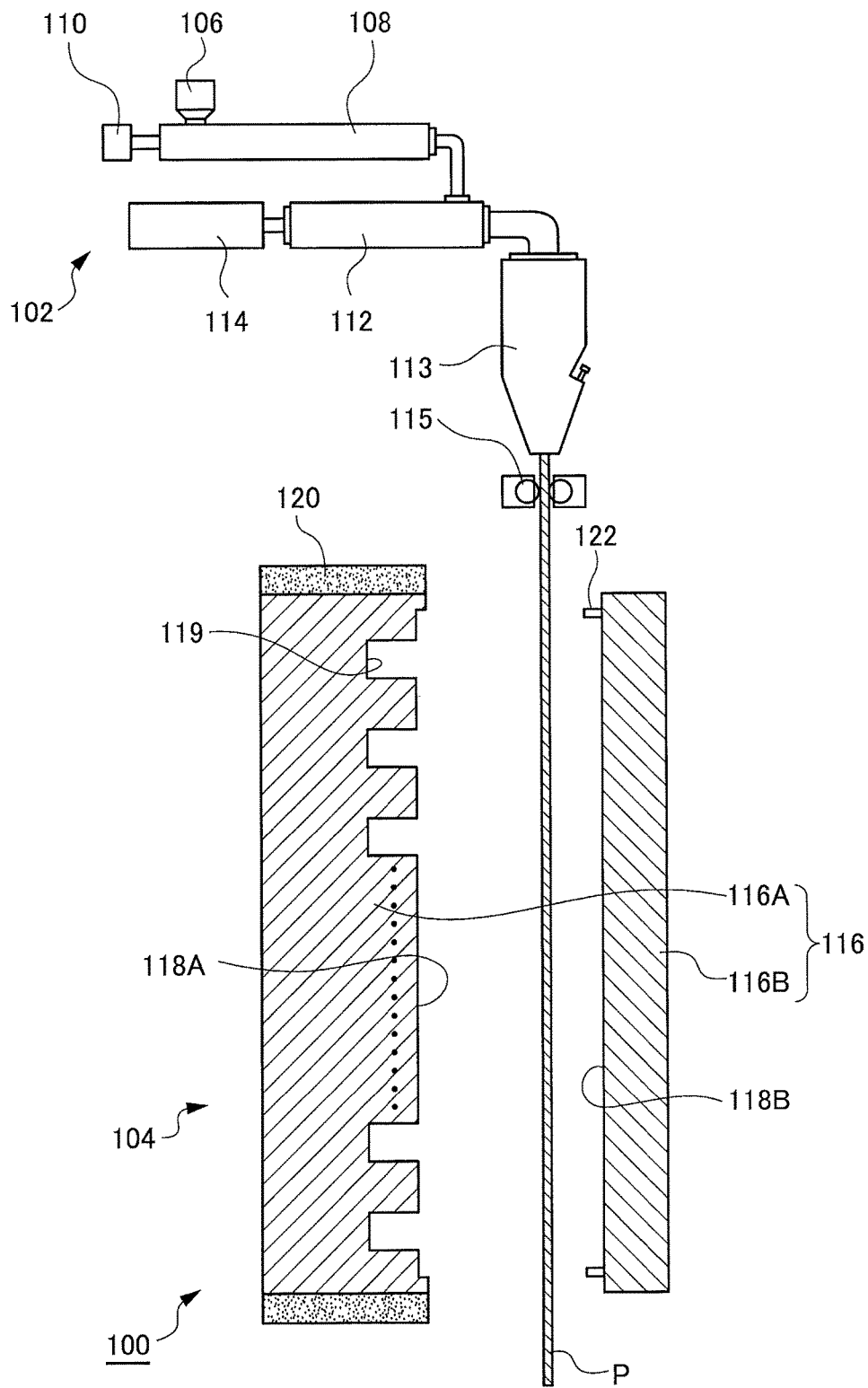

[FIG. 19]
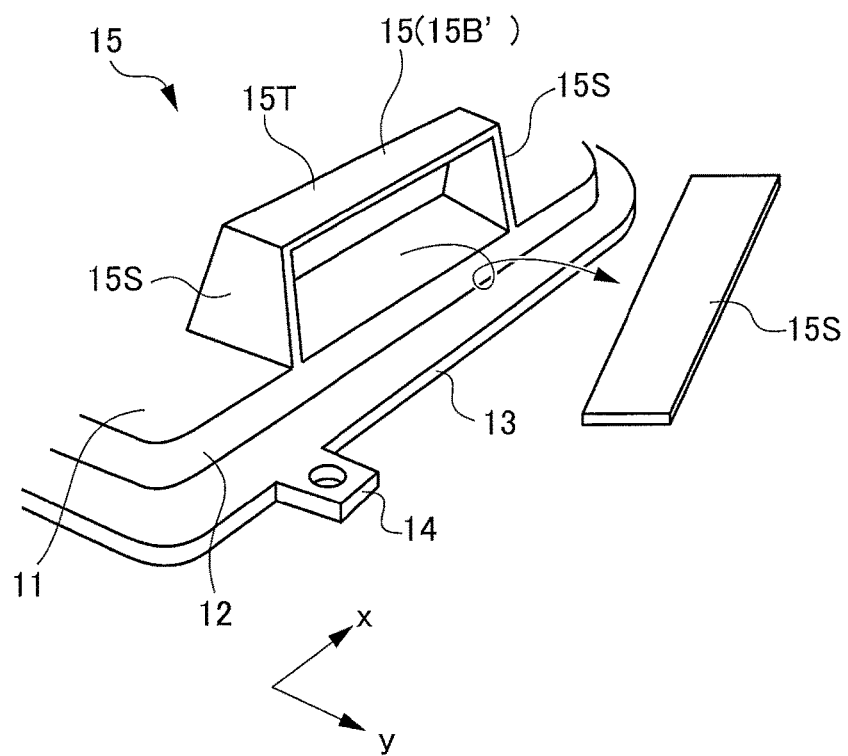

[FIG. 20]
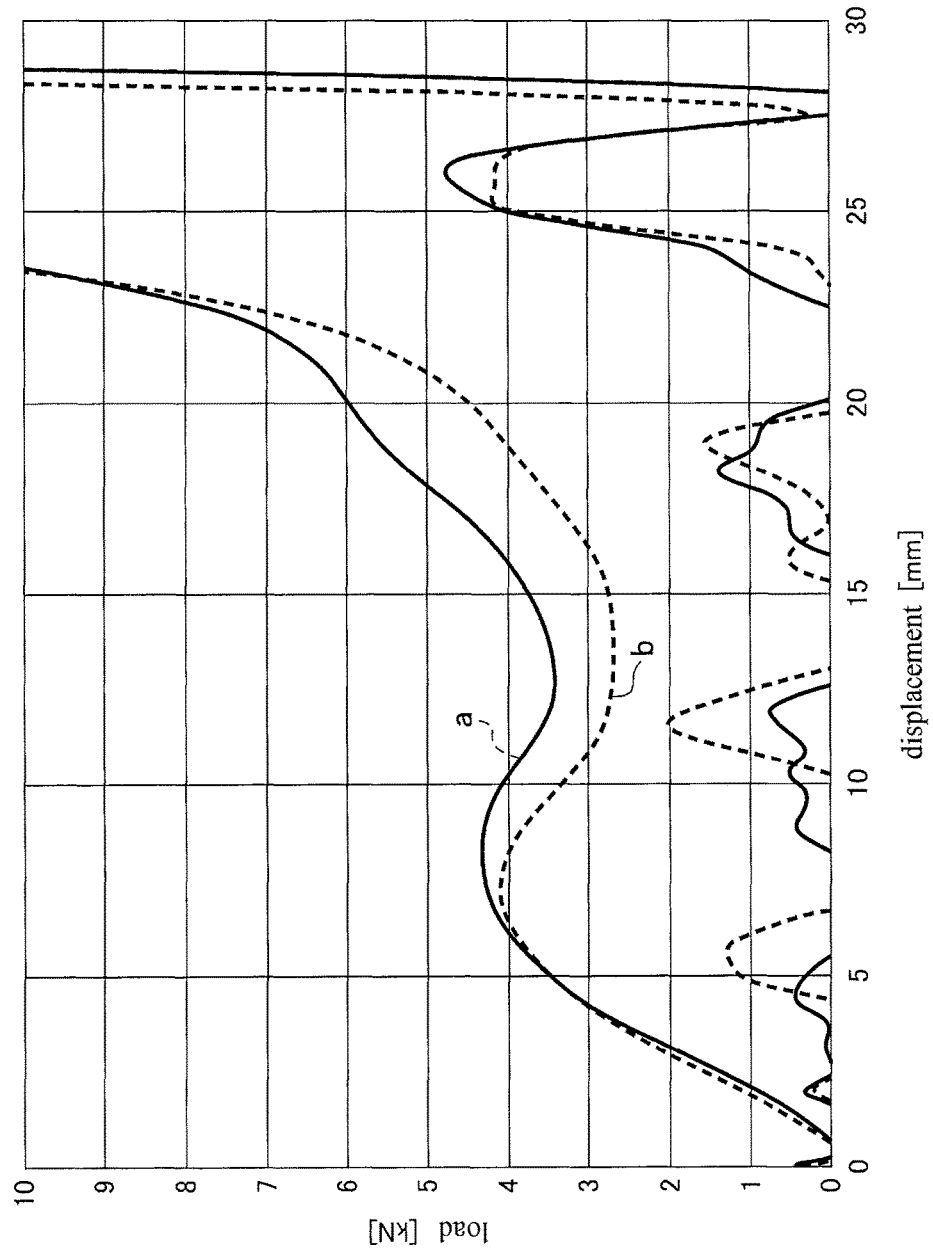

[FIG. 21]
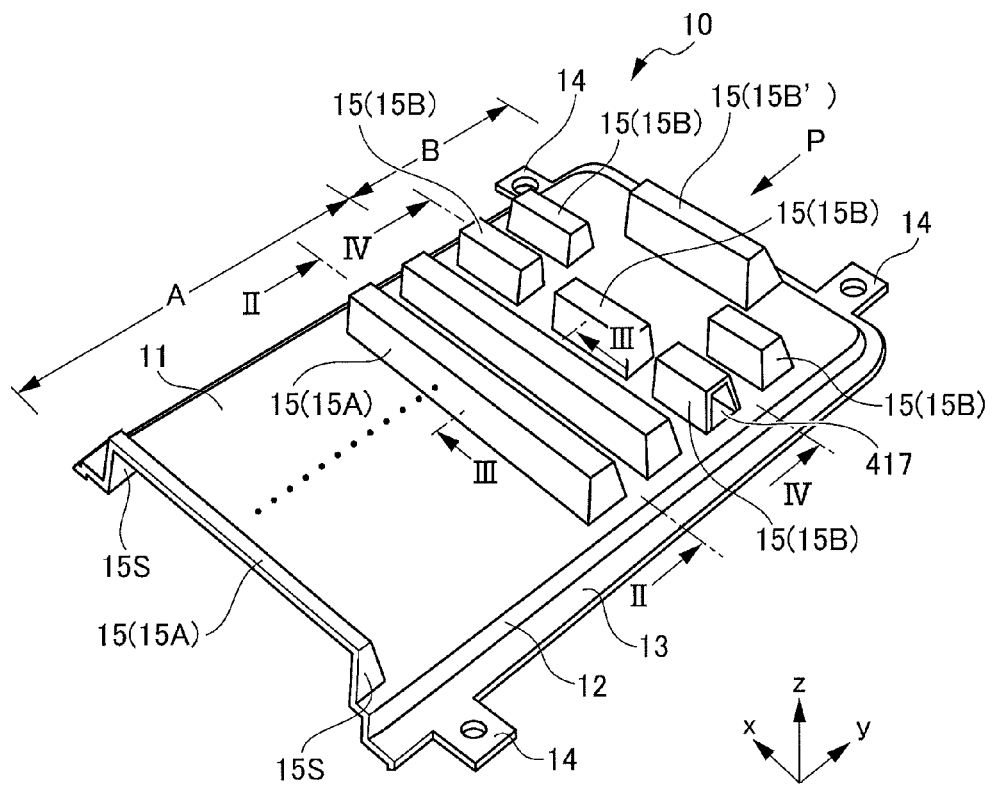

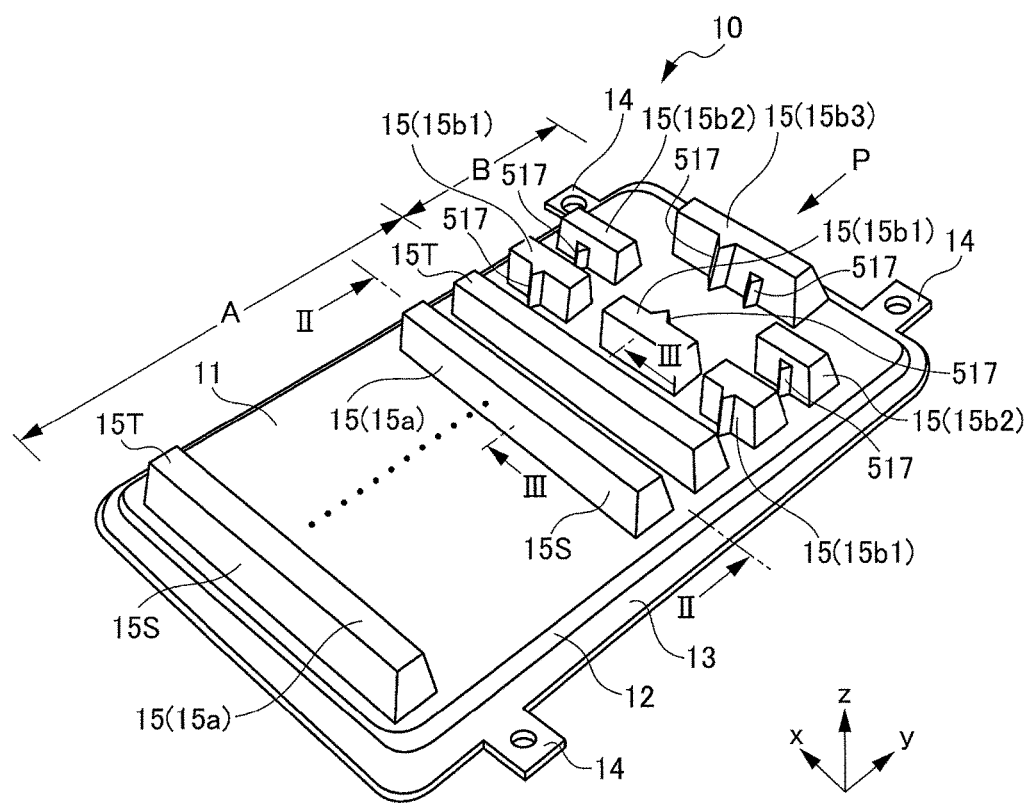
[FIG. 22A]

[FIG. 22B]
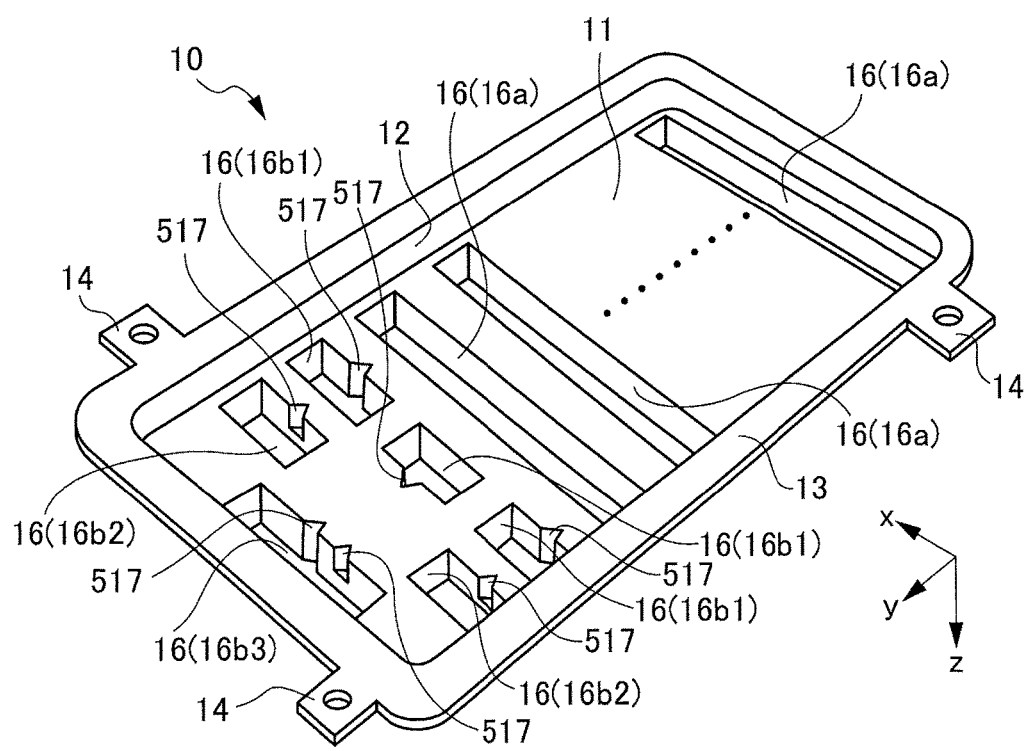

[FIG. 23A]
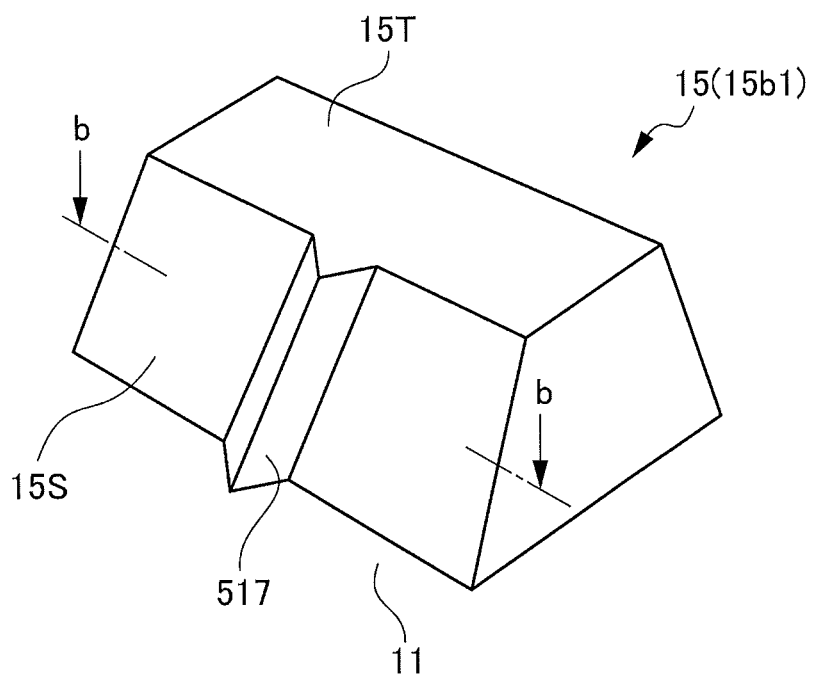
[FIG. 23B]
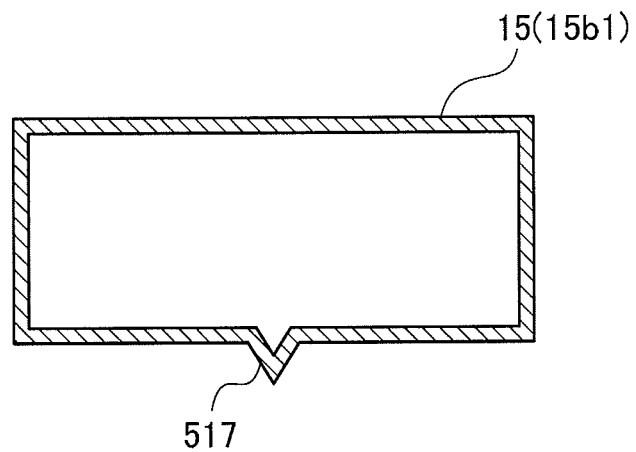

[FIG. 24]
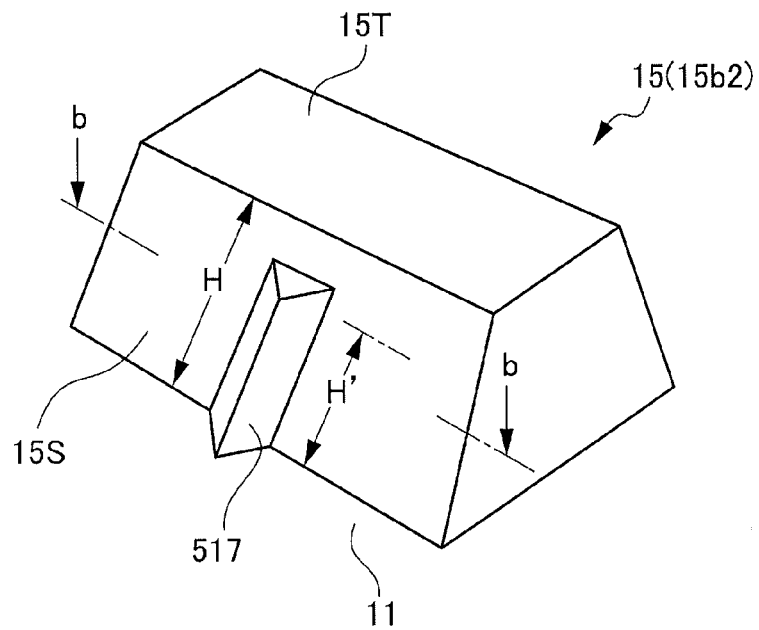
[FIG. 25]
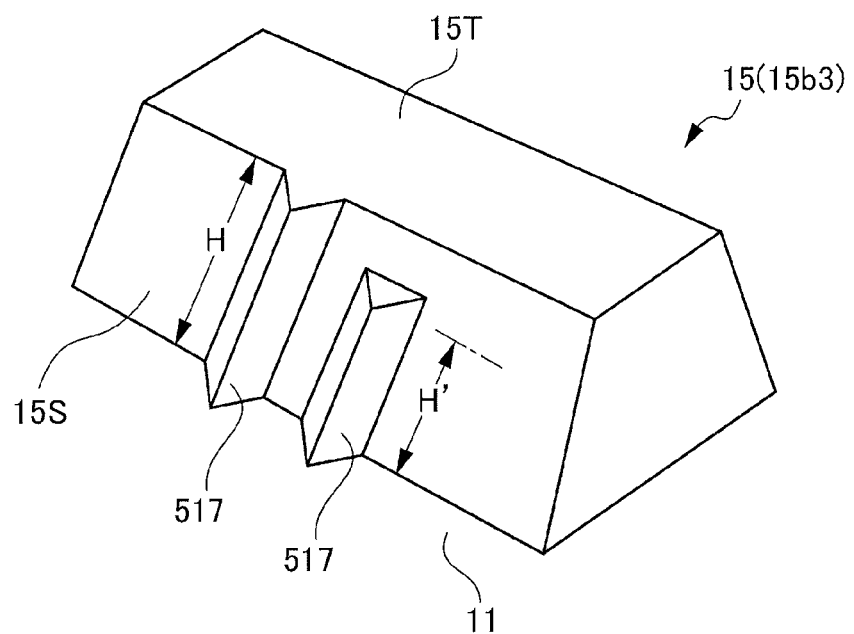

[FIG. 26A]
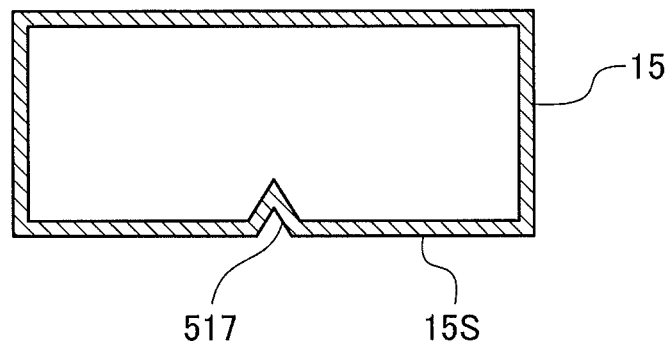
[FIG. 26B]
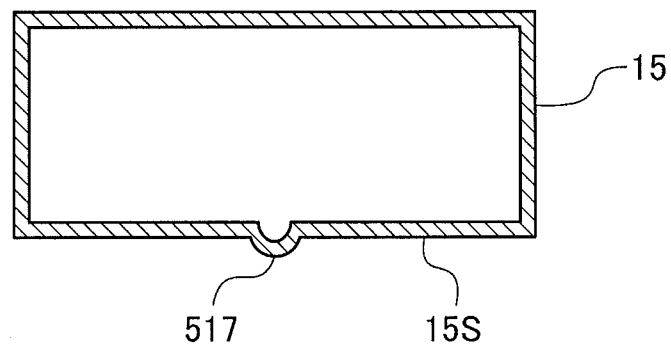
[FIG. 26C]
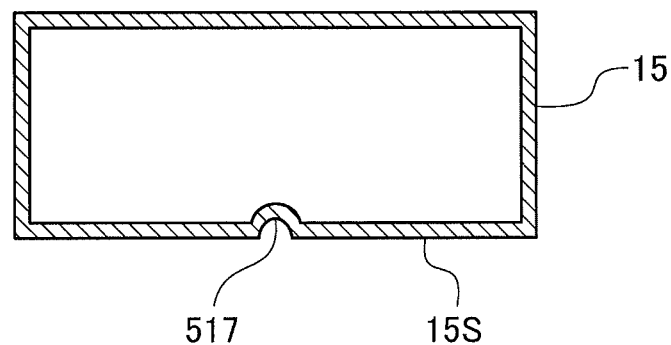

[FIG. 27]
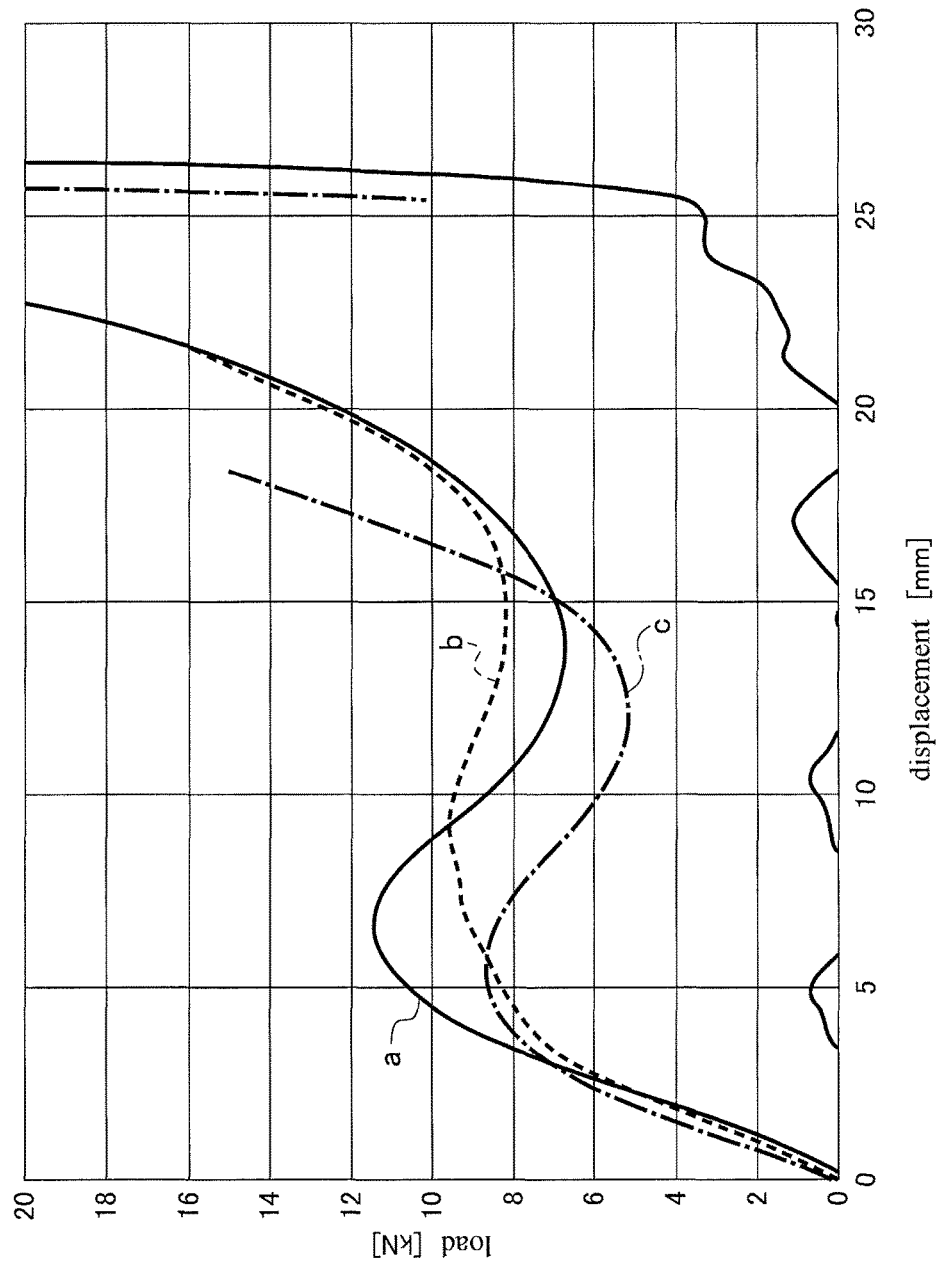

[FIG. 28]
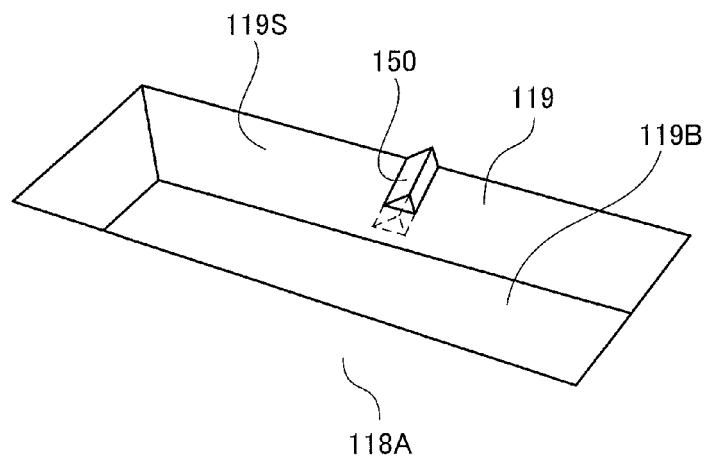
[FIG. 29]
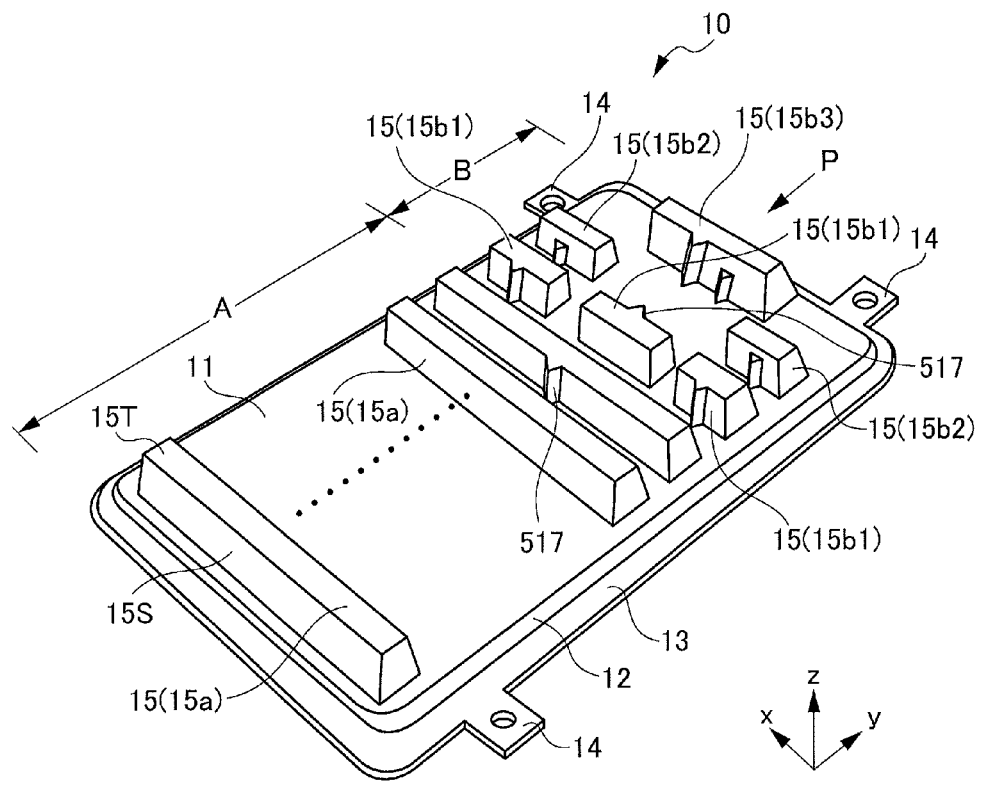

[FIG. 30A]
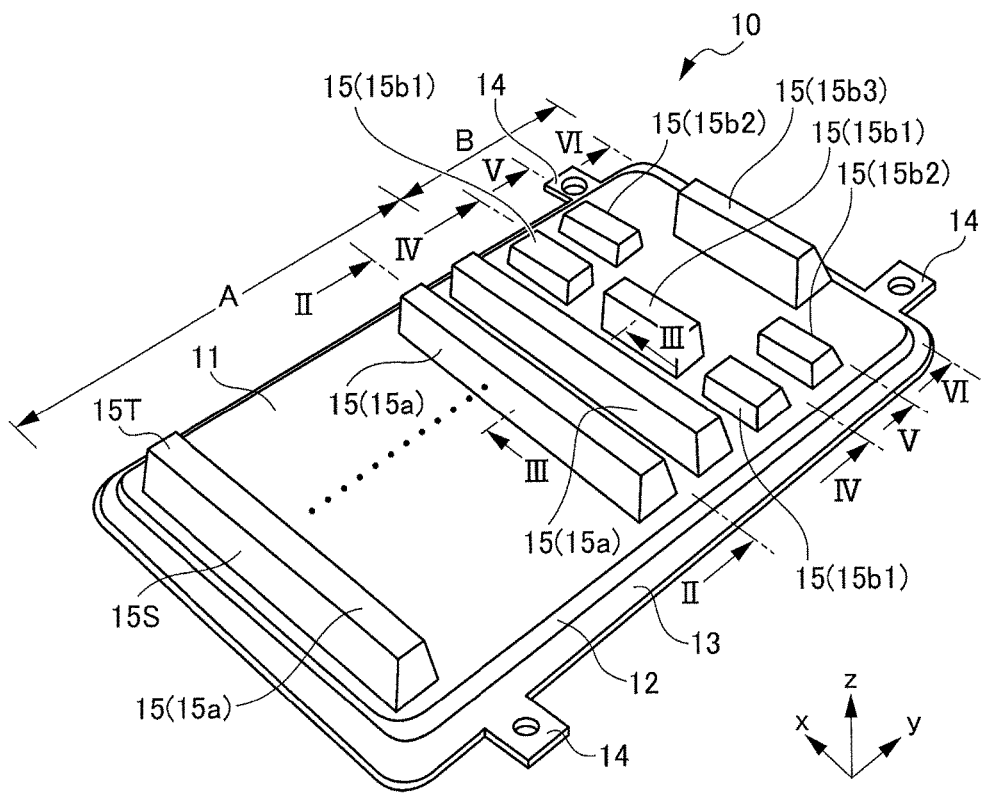

[FIG. 30B]
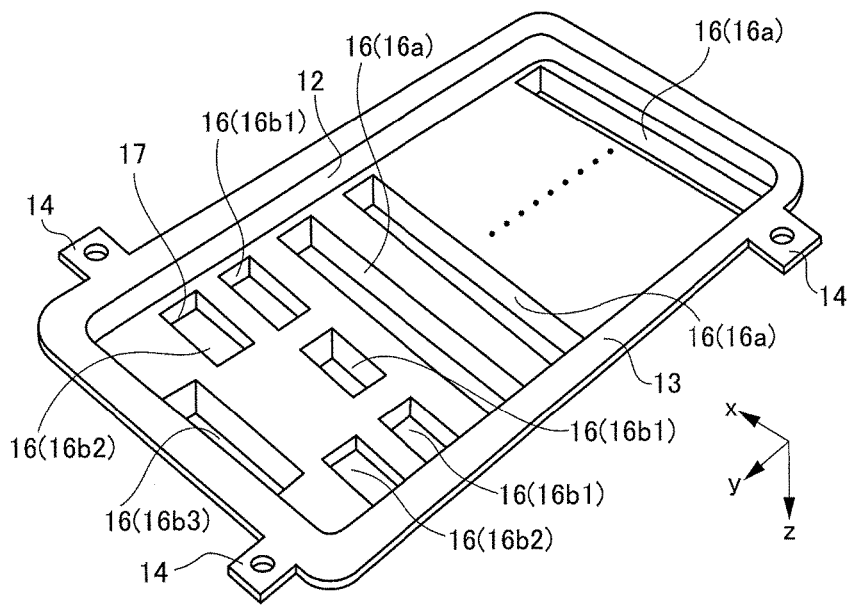
[FIG. 31]
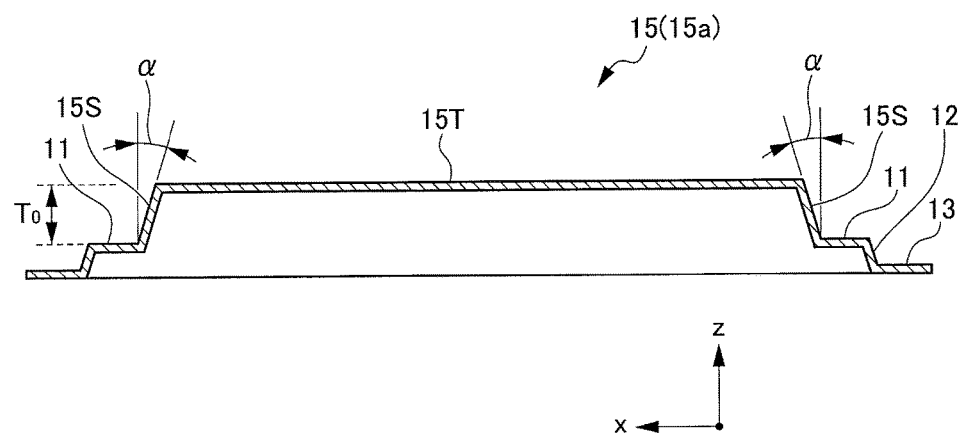

[FIG. 32]
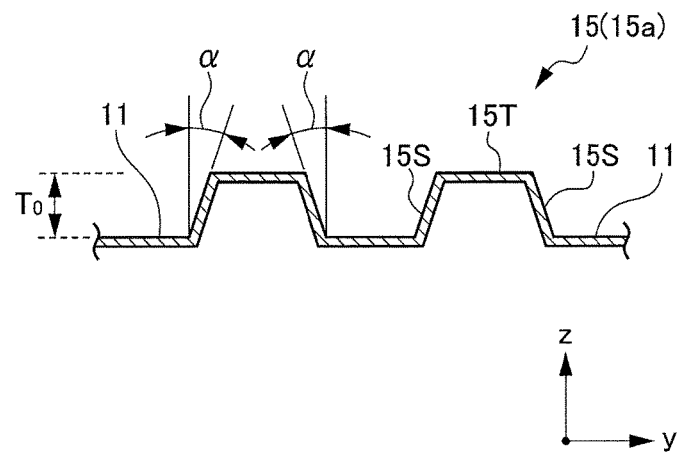
[FIG. 33]
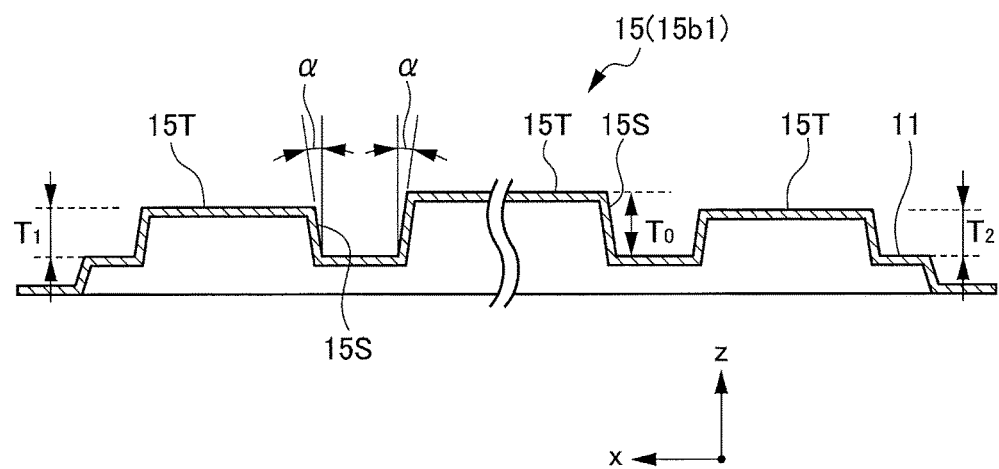

[FIG. 34]
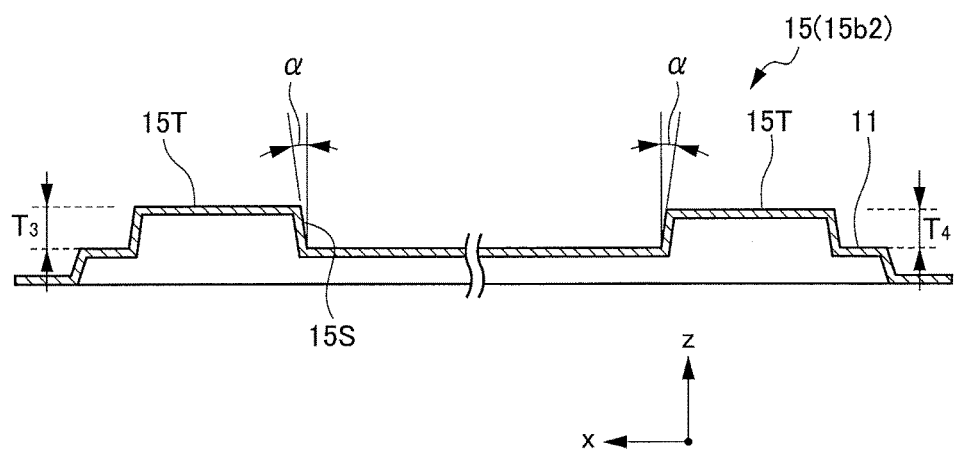
[FIG. 35]
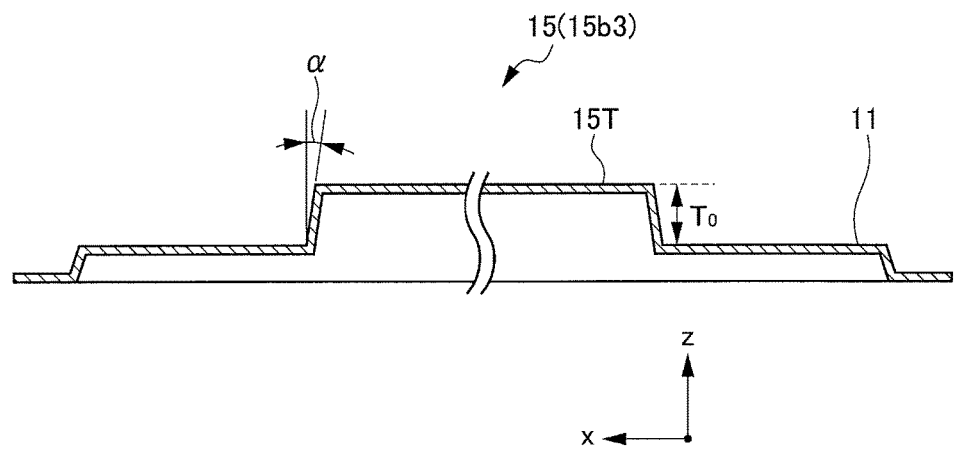

[FIG. 36]
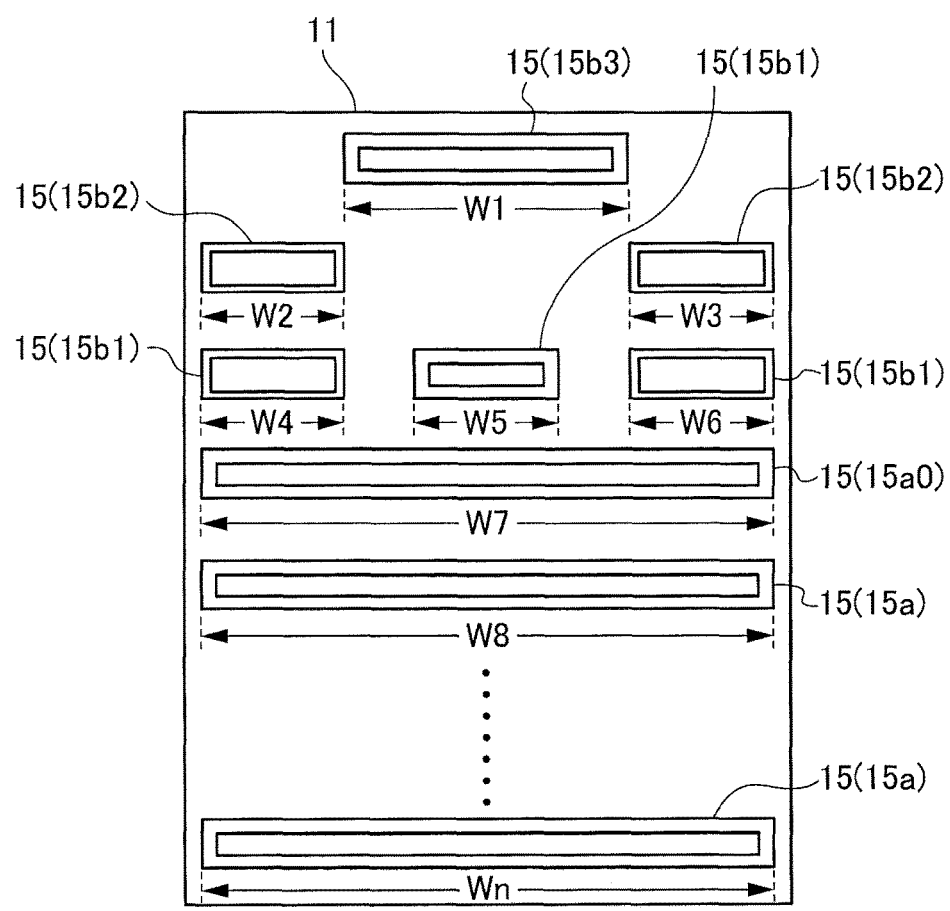

[FIG. 37]
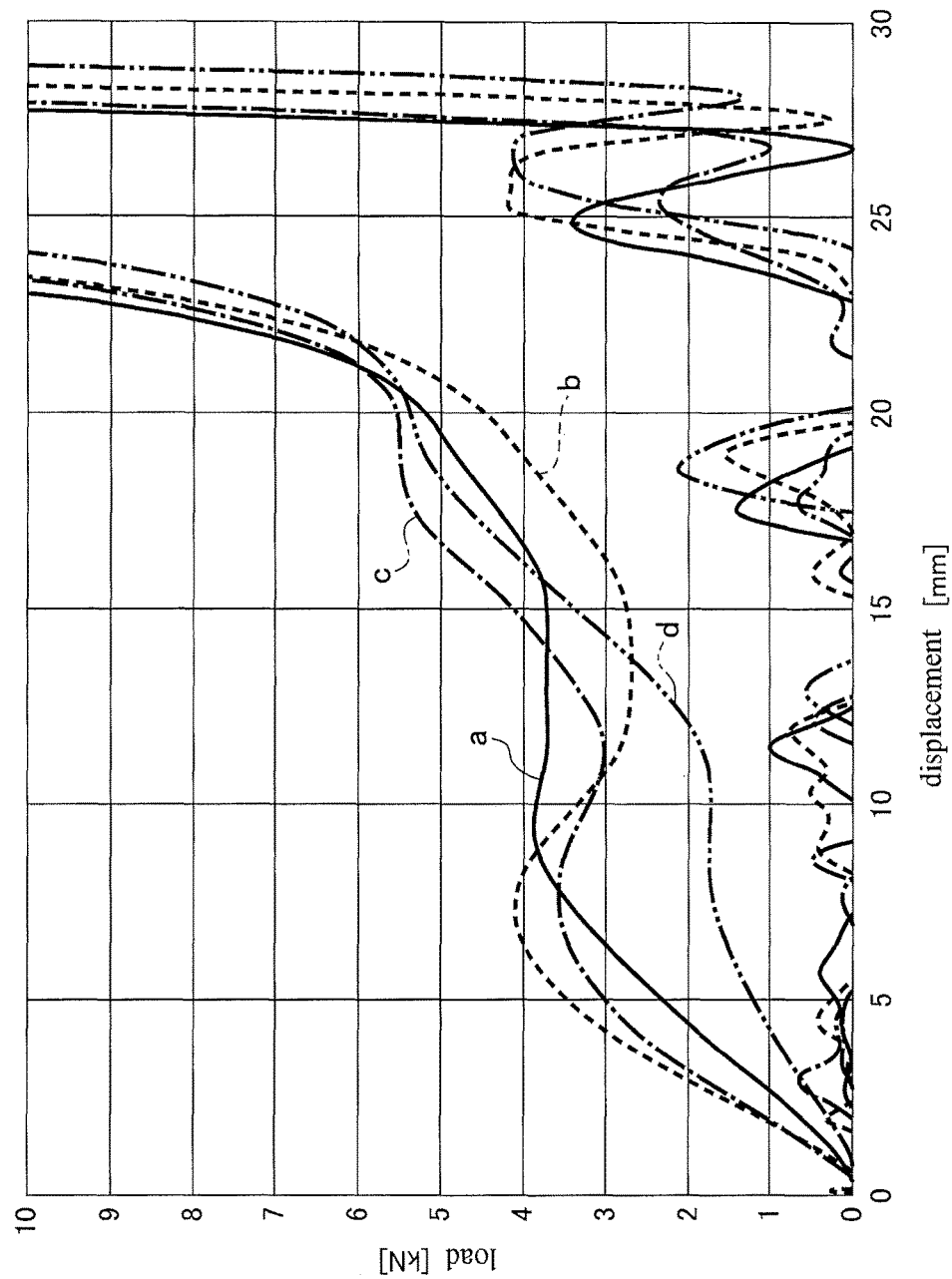

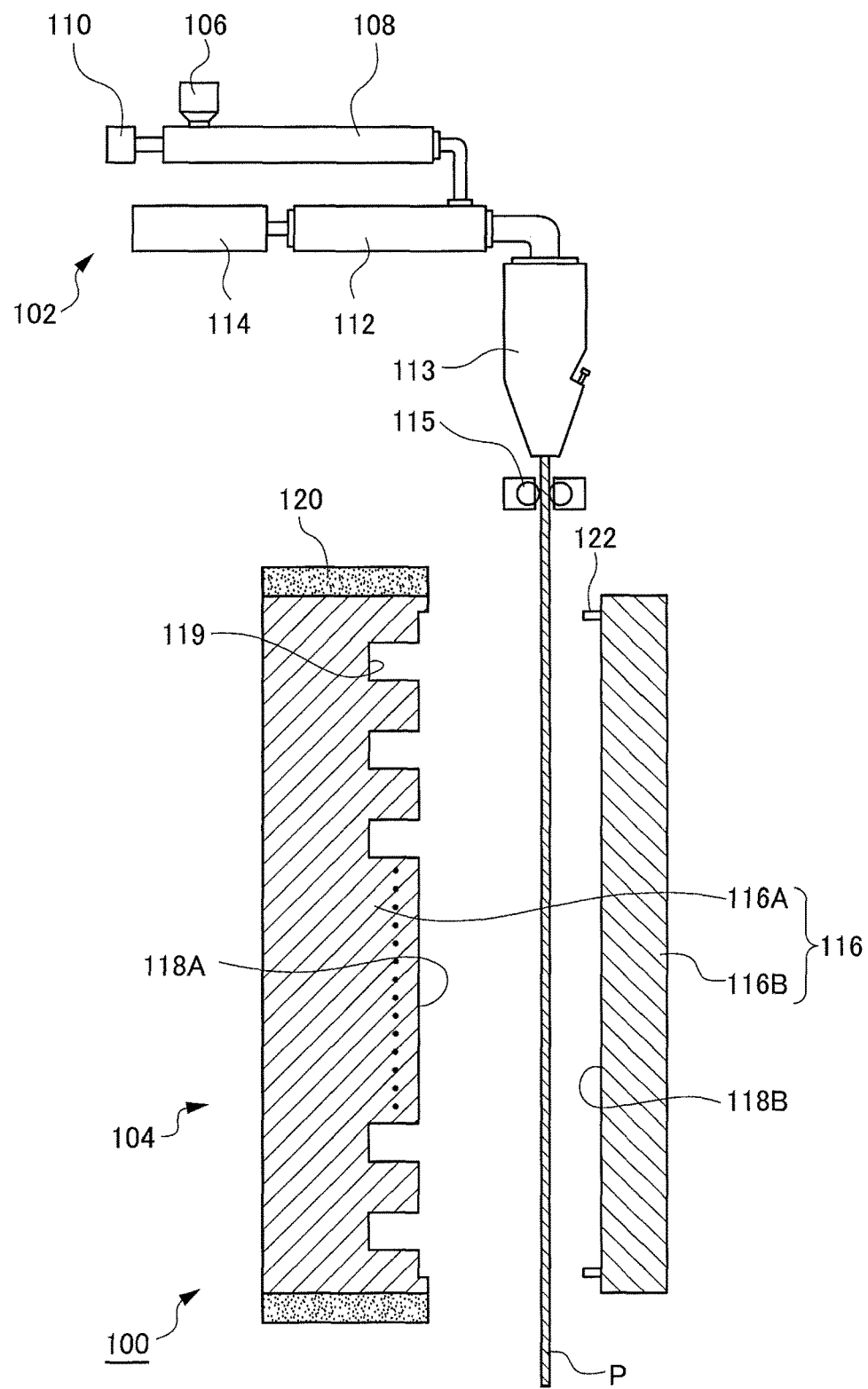
[FIG. 38]

[FIG. 39A]
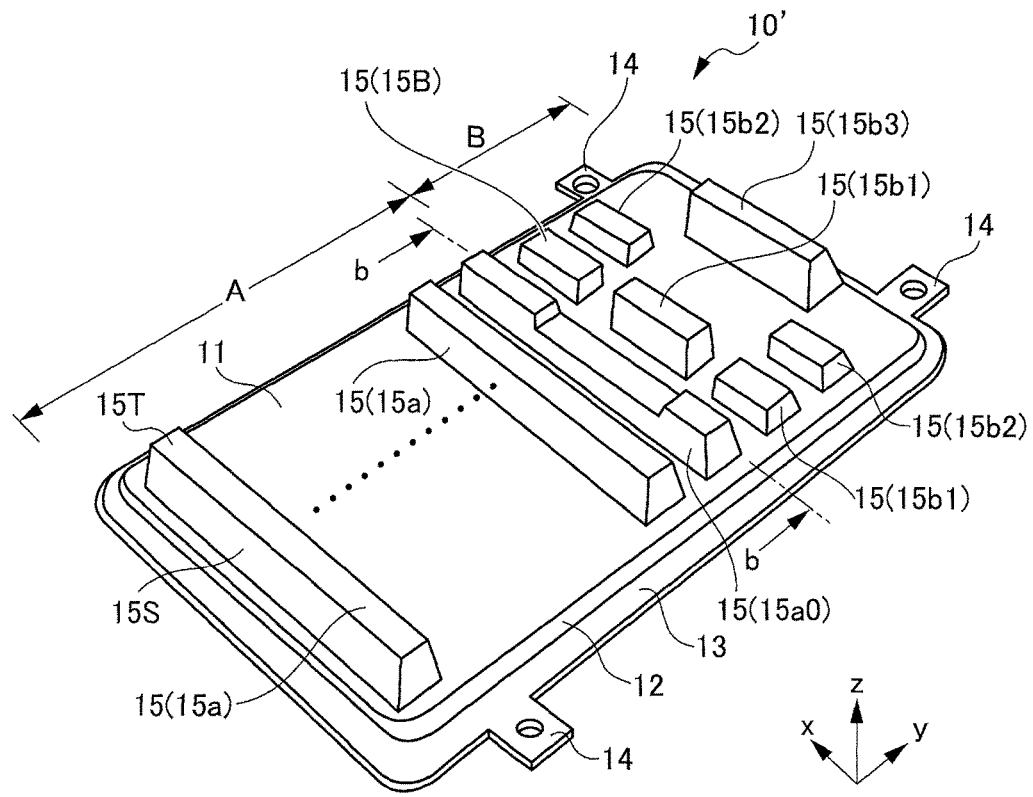
[FIG. 39B]
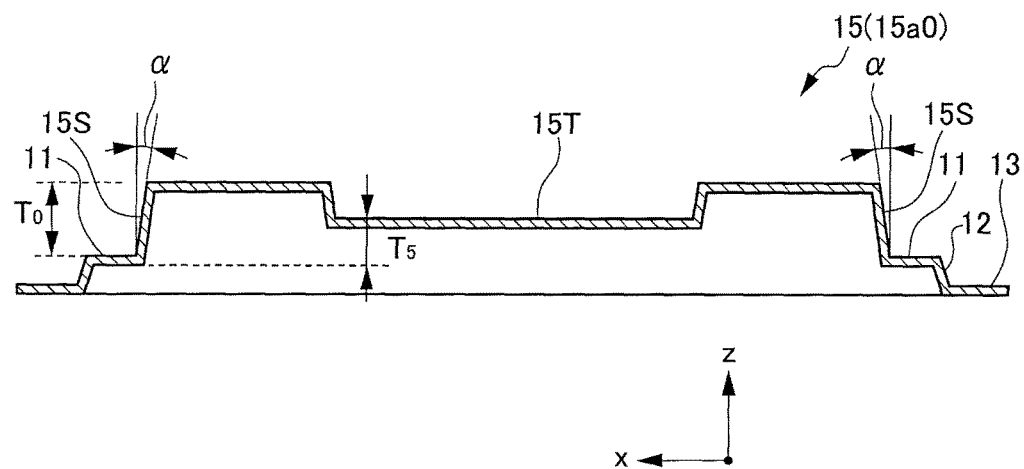

IMPACT ENERGY ABSORBER

TECHNICAL FIELD

The invention relates to an impact energy absorber, in particular, an impact energy absorber which is produced by a formation of a plate-shaped resin material.

BACKGROUND OF THE INVENTION

An impact energy absorber absorbs an impact energy accompanied by an impact load from the outside due to a vehicle collision so as to protect a passenger inside the vehicle. The impact energy absorber may be disposed inside, for example, a door panel or a ceiling panel.

A conventional impact energy absorber has a first wall which is disposed in a side receiving an shock or impact, a second wall disposed apart from the first wall through a hollow portion and opposed to the first wall, and a plurality of impact absorbing ribs including a deep groove portion and a shallow groove portion. The deep groove portion is obtained by recessing the first and second walls in the form of long groove, and joining the tip surfaces of the first and second walls together to form a weld surface. The shallow groove portion is obtained by opposing the tip surfaces apart from each other. For more detail, see Patent Document 1.

However, in the case of the afore-mentioned conventional impact energy absorber as disclosed in Patent Document 1, when the impact load acts on the load-receiving surface head on, the air pressure inside a hermitically sealed hollow portion is elevated, resulting in increase in repulsion force. In this case, enough distortion of the impact energy absorber may be hardly obtained, thereby failing to obtain desired impact energy absorbing properties.

In order to overcome the above drawbacks, there has been proposed another impact energy absorber, which is a single wall, solid plate structure. The impact energy absorber is provided with a plurality of projections (i.e., impact absorbing ribs), which is obtained by forming a plurality of parallel long grooves disposed apart from each other in a planar portion. For more detail, see Patent Document 2.

However, as the impact absorber as disclosed in Patent Document 2 has less surface area of the planar portion in comparison with the surface area occupied by the projections, warpage easily occurs in the planar portion. As a result, the impact energy absorber get slightly distorted.

Furthermore, in order to overcome the drawbacks found in the impact energy absorber as disclosed in Document Patent 1, it may be also considered that the impact energy absorber is provided with a plurality of projections (i.e., impact absorbing rib), which is obtained by forming a plurality of parallel long grooves apart from each other in a planar portion and the thickness of the impact absorbing rib is modified to limit the relation of the surface area of the cross section of the impact absorbing projection within a certain range, thereby adjusting displacement due to the load.

However, as such a configuration should be applied to the plurality of impact absorbing ribs which is formed within a limited space, the impact energy absorber as a whole is necessarily further complicated and the freedom of designing or setting the impact absorbing rib is considerably compromised.

CITATION LIST

Patent Literature

Patent Document 1: WO2008/105517 (A)

Patent Document 2: Japanese patent publication No. 2012-192794 (A)

BRIEF DESCRIPTION OF THE INVENTION

In view of the above, in one aspect, the invention is to provide an impact energy absorber with desired absorbing properties while being capable of avoiding the incidence of warpage.

In another aspect, the invention is to provide an impact energy absorber with a simple configuration while being capable of increasing the freedom of designing or setting an impact absorbing rib having a projection.

(1) One embodiment of the invention provides an impact energy absorber produced by a formation of a plate-shaped resin material. The impact energy absorber has a planar portion, and at least one projection projecting from one surface of the planar portion. The planar portion has a plurality of groove-shaped peripheral ribs in an opposite surface at a periphery thereof. The plurality of groove-shaped peripheral ribs extends in a direction intersecting with a circumferential direction of the planar portion, and is aligned in the circumferential direction of the planar portion.

(2) The impact energy absorber according to (1), at least one of the plurality of groove-shaped peripheral ribs communicates with a peripheral edge surface of the periphery.

(3) The impact energy absorber according to (1), at least one of the plurality of groove-shaped peripheral ribs communicates with an interior wall surface of a depression which results from and reflects the projection.

(4) The impact energy absorber according to (1), the at least one projection has a side wall portion bent with respect to the planar portion, and a ceiling portion connecting to a top of the side wall portion, and the at least one projection has an opening which is at least partly formed in the side wall portion.

(5) The impact energy absorber according to (4), the at least one projections is a plurality of the projections; the plurality of projections comprises a first projection; and the opening of the first projection is at least partly formed in the side wall portion of the first projection.

(6) The impact energy absorber according to (4), the at least one projection extends in a direction parallel to the planar portion, and the opening of the at least one projection is at least partly formed in the side wall portion intersecting with the direction parallel to the planar portion.

(7) The impact energy absorber according to (4), the at least one projection extends in a direction parallel to the planar portion, and the opening of the at least one projection is at least partly formed in the side wall portion parallel to the planar portion.

(8) The impact energy absorber according to (4), the opening of the at least one projection partly defines a peripheral edge surface of the impact energy absorber.

(9) The impact energy absorber according to (1), the at least one projection has a side wall portion bent with respect to the planar portion, and a ceiling portion connecting to a top of the side wall portion, and the side wall portion has a side wall rib extending in a direction from the planar portion toward the ceiling portion.

(10) The impact energy absorber according to (9), the side wall rib extends to an extent of from 50% to 100% of a distance from the planar portion to the ceiling portion.

(11) The impact energy absorber according to (9), the side wall rib extends to an extent of from 50% to 80% of a distance from the planar portion to the ceiling portion.

(12) The impact energy absorber according to (9), the side wall rib is convex or concave with respect to a surface of the side wall portion.

(13) The impact energy absorber according to (1), the at least one projection is a plurality of the projections; each of the projections has a side wall portion bent with respect to the planar portion and a ceiling portion connecting to a top of the side wall portion; the plurality of projections comprises a first projection and second projection; and the first projection is different from the second projection in terms of a height from the planar portion to the ceiling portion.

(14) The impact energy absorber according to (13), at least one of the first and second projections has a partly variable height from the planar portion to the ceiling portion thereof.

(15) The impact energy absorber according to (13), at least one of the first and second projections has a value of from 60% to 95% as a ratio of a height of a lower ceiling portion to a height of a higher ceiling portion.

(16) The impact energy absorber according to (13), the plurality of projections has a value of from 5% to 20% as a ratio of a sum of longitudinal lengths of the lower ceiling portion of each projection to a sum of longitudinal lengths of the highest ceiling portion of each projection.

The above impact energy absorber has desired absorbing properties and is capable of avoiding the incidence of warpage.

Furthermore, the above impact energy absorber, even with a simple configuration, can allow for the increased freedom of designing or setting the impact absorbing rib provided with the projection.

BRIEF DESCRIPTION OF THE DRAWINGS

FIG. 1 is a perspective view of a first embodiment of an impact energy absorber in accordance with the invention.

FIG. 2 is a plan view of the first embodiment of the impact energy absorber in accordance with the invention FIG. 3 is a cross-sectional view of FIG. 2 along the line III-III.

FIG. 4 is a cross-sectional view of FIG. 2 along the line IV-IV.

FIG. 5 is a cross-sectional view of FIG. 2 along the line V-V.

FIG. 6 is a cross-sectional view of FIG. 2 along the line VI-VI.

FIG. 7 illustrates an exemplary application of the first embodiment of the impact energy absorber.

FIG. 8 is a cross-sectional view showing the first step of a process for forming the first embodiment of the impact energy absorber.

FIG. 9 is a cross-sectional view showing the second step of the process for forming the first embodiment of the impact energy absorber.

FIG. 10 is a cross-sectional view showing the third step of the process for forming the first embodiment of the impact energy absorber.

FIG. 11 is a cross-sectional view showing the fourth step of the process for forming the first embodiment of the impact energy absorber.

FIG. 12 is a cross-sectional view showing the fifth step of the process for forming the first embodiment of the impact energy absorber.

FIG. 13A is a perspective view of a second embodiment of an impact energy absorber in accordance with the invention from a top side.

FIG. 13B is a perspective view of the second embodiment of the impact energy absorber from a bottom side.

FIG. 14 is a cross-sectional view of FIG. 13A along the line II-II.

FIG. 15 is a cross-sectional view of FIG. 13A along the line III-III.

FIG. 16 is a cross-sectional view of FIG. 13A along the line IV-IV.

FIG. 17A is a perspective view of the projection of FIG. 13A viewed in P direction.

FIG. 17B is a perspective view of another projection.

FIG. 18 is a cross-sectional view illustrating a first step of a process for forming the second embodiment of the impact energy absorber in accordance with the invention.

FIG. 19 is a cross-sectional view illustrating a sixth step of the process for forming the second embodiment of the impact energy absorber in accordance with the invention.

FIG. 20 is a graph showing the relationship between the load and the displacement of the second embodiment of the impact energy absorber due to the load.

FIG. 21 depicts a configuration of a modified version of the second embodiment of the impact energy absorber in accordance with the invention.

FIG. 22A a perspective view of a third embodiment of the impact energy absorber viewed from a top.

FIG. 22B is a perspective view of the third embodiment of the impact energy absorber viewed from a bottom.

FIG. 23A is an enlarged perspective view of one projection.

FIG. 23B is a cross-sectional view of the FIG. 23A along the line b-b.

FIG. 24 is an enlarged perspective view of another projection.

FIG. 25 is an enlarged perspective view of another projection.

FIG. 26A depicts another exemplary rib which is formed in the projection.

FIG. 26B depicts another exemplary rib which is formed in the projection.

FIG. 26C depicts another exemplary rib which is formed in the projection.

FIG. 27 is a graph showing the relationship between the load and the displacement of the third embodiment of the impact energy absorber due to the load.

FIG. 28 depicts a depression formed within a cavity of a mold.

FIG. 29 depicts a configuration of a modified version of the third embodiment of the impact energy absorber in accordance with the invention.

FIG. 30A is a perspective view of a fourth embodiment of the impact energy absorber in accordance with the invention, viewed from a top.

FIG. 30B is a perspective view of the fourth embodiment of the impact energy absorber in accordance with the invention, viewed from a bottom.

FIG. 31 is a cross-sectional view of FIG. 30A along the line II-II.

FIG. 32 is a cross-sectional view of FIG. 30A along the line III-III.

FIG. 33 is a cross-sectional view of FIG. 30A along the line IV-IV.

FIG. 34 is a cross-sectional view of FIG. 30A along the line V-V.

FIG. 35 is a cross-sectional view of FIG. 30A along the line VI-VI.

FIG. 36 illustrates the ratio of lower projections and higher projections in connection with the sum of the longitudinal length of the projections.

FIG. 37 is a graph showing the relationship between the load and the displacement of the fourth embodiment of the impact energy absorber due to the load.

FIG. 38 is a cross-sectional view showing the first step of a process for forming the fourth embodiment of the impact energy absorber.

FIGS. 39A and 39B depict a configuration of a modified version of the fourth embodiment of the impact energy absorber.

DETAILED DESCRIPTION OF THE INVENTION

Referring to the accompanying drawings, embodiments of the present invention will be hereinafter described in detail. Furthermore, the same reference numeral is assigned to the same element or part throughout the overall specification.

First Embodiment

FIG. 1 is a perspective view of a first embodiment of an impact energy absorber in accordance with the invention. An impact energy absorber 10 as shown in FIG. 1 has a rectangular thin plate-shaped single wall configuration, and may be integrally formed in accordance with a molding process which will be described below. The material for the impact energy absorber 10 may be thermoplastic resin, for example polyolefin resin such as polyethylene and polypropylene, or amorphous resin, specifically, polyololefin which is a homopolymer or copolymer of olefin such as ethylene, propylene, butene, isoprenepentene, methylpentene (e.g., polypropylene, high density polyethylene).

Referring to FIG. 1, the impact energy absorber 10 has a planar portion 311, and a plurality of projections 312 (e.g., three in FIG. 1) projecting from one surface (e.g. a lower portion in FIG. 1) of the planar portion 311.

The projection 312 projects from the center portion except for a periphery (i.e., a flange) 313 of the planar portion 311. Each of projections 312 extends in "x" direction (see FIG. 1) and the plurality of projections 312 is aligned with each other in "y" direction (see FIG. 1). Each of the projections 312 is formed in a trapezoidal shape. In other words, each of the projections 312 has a rectangular-shaped ceiling portion 312T which is disposed in parallel with the rectangular-shaped planar portion 311, and an exterior wall surface 312S which connects to each edge of the ceiling portion 312T and is curved or bent with respect to the planar portion 311.

In an opposite surface (i.e., an upper surface in FIG. 1) of the planar portion 311 there are provided three depressions which result from and reflect the projections 31. The three depressions extend in "x" direction (see FIG. 1) and are aligned with each other in "y" direction (see FIG. 1). The depressions 312 are indicated by the reference signs 314A, 314B, and 314C in the following description as a matter of convenience.

A peripheral edge surface of the planar portion 311 is provided with a plurality of coupling portions 318 (e.g., three coupling portions 318 in FIG. 1) which outwardly extends from the peripheral edge surface and is arranged apart from each other in a circumferential direction. The coupling portion 318 is provided for coupling or mounting the impact energy absorber 10 to a vehicle. See FIG. 7.

Furthermore, a plurality of concave portions 315 is disposed at a region P between the neighboring depressions 314A, 314B in the opposite surface (i.e., the upper surface in FIG. 1) of the planar portion 311. The plurality of concave portions 315 (e.g., three concave portions 315 in FIG. 1) extends in a direction where it communicates with the interior wall surfaces 314S of the neighboring depressions 314A, 314B (i.e., in "y" direction in FIG. 1), and is aligned with each other at even intervals in "x" direction (FIG. 1). Furthermore, the plurality of concave portions 315 (e.g., three concave portions 315) is also disposed at a region Q between the neighboring depression 314B, 134C such that it communicates with the interior wall surfaces 314S of the neighboring depressions 314B, 314C (i.e., in "y" direction in FIG. 1). The plurality of concave portions 315 (e.g., three concave portions 315 in FIG. 1) that is disposed in the region Q is also aligned with each other at even intervals in "x" direction (FIG. 1).

Furthermore, the concave portion 315 has a depth less than that of the depression 314. The planar portion 311 has a convex portion 316 in one surface thereof (i.e., the lower surface in FIG. 1), and the convex portion 316 results from and reflects the concave portion 315. See FIGS. 4 and 6. Due to the convex portion 316 (i.e., the concave portion 315) a space enough for distortion or deformation can be secured against an impact load which is diagonally applied to the impact energy absorber 10, thereby preventing the variation in local energy absorbing properties.

In addition, referring to FIG. 2 which is a top view of the impact energy absorber 10, a plurality of groove-like peripheral ribs 317 is formed in the periphery (i.e., the flange) 313 of the opposite surface (i.e., the upper surface in FIG. F1) of the planar portion 311. The plurality of peripheral ribs 317 (e.g., twenty five peripheral ribs in FIG. 2) extends in a direction intersecting with the circumferential direction and is aligned with each other in the circumferential direction.

The plurality of peripheral ribs 317 includes a peripheral rib 317A which communicates with the peripheral edge surface of the periphery (i.e., the flange) 313 at its one end and communicates with the interior wall surface 314S of the depression 314 at its opposite end, and a peripheral rib 317B which communicates with the peripheral edge surface of the periphery (i.e., the flange) at its one end and does not communicate with the side wall surface of the depression at its opposite end. Furthermore, a groove of the peripheral rib 317 has a depth less than that of the concave portion 315. In this regard, the peripheral rib 317 is preferably formed such that it projects in the same direction as the projection 312 projects. This is because if the peripheral rib 317 projects in a direction opposite to the direction in which the projection 312 projects a surface of the impact energy absorber 10 to be coupled to other part(s) projects due to the peripheral rib 317.

The peripheral rib 317A may be disposed adjacent to the depression 314 in a periphery (i.e., the flange) 313 of the planar portion 311, and the peripheral rib 317B may be disposed adjacent to the region P and/or the region Q in the periphery (i.e., the flange) 313 of the planar portion 311.

FIG. 3 is a cross-sectional view of FIG. 2 along the line III-III. Referring to FIG. 3, the projection 312 has a pair of exterior wall surfaces 312S intersecting with the longitudinal (i.e., extending) direction of the projection 312. The pair of exterior wall surfaces 312S is inclined at an angle α (e.g., an angle of from 3 to 10 degrees) in a direction of approaching each other as it gets close to the ceiling surface 312T. Furthermore, even a pair of exterior wall surfaces 312S which is substantially parallel to the longitudinal (i.e., extending) direction of the projection 312 is inclined at an angle α (e.g., an angle of from 3 to 10 degrees) in a direction of approaching each other as it gets close to the ceiling surface 312T. See FIGS. 4 and 5. The afore-mentioned exterior wall surface 312S can be called as an inclined wall. When an impact load is applied to the planar portion 311 in a trigonal direction, such a projection 312 can prevent the collapse of the inclined wall. Also, when the impact load is perpendicularly applied to the planar portion 311, such a projection 312 can prevent the ceiling portion 315T from sinking to or falling down to the planar portion 311. The peripheral rib 317A is formed in the periphery (i.e., the flange) 313 at each edge of the projection 312 in its longitudinal direction (i.e., "x" direction) such that it communicates with the peripheral edge surface of the periphery (i.e., the flange) 313 at its one end and communicates with the interior wall surface 312S of the depression 314 at its opposite end. Furthermore, referring to FIG. 3, three concave portions 315 are formed along "x" direction in the planar portion 311 at the region Q connecting to the interior wall surface 314S of the depression 314.

FIG. 4 is a cross-sectional view of FIG. 2 along the line VI-VI. Referring to FIG. 4, the projection 312 has the pair of exterior wall surfaces 312S, which is parallel to the longitudinal (extending) direction of the projection 312 and is inclined at an angle α (an angle of from 3 to 10 degrees) in a direction of approaching each other as it gets close to the ceiling surface 312T. The afore-mentioned exterior wall surface 312S can be called as an inclined wall. By the adopting the configuration that the pair of exterior wall surface 312S intersecting with the longitudinal direction of the projection 312 as well as the pair of exterior wall surfaces 312S substantially parallel to the longitudinal direction of the projection 312 are inclined, the same effect as mentioned above can be attained. The peripheral rib 317 is formed in the planar portion 313 at one end (left side in FIG. 4) in a direction where the plurality of projections 312 is aligned (i.e., "y" direction in FIG. 4). The peripheral rib 317 communicates with the peripheral edge surface of the periphery (i.e., the flange) 313 at its one end and with the interior wall surface 314S of the depression 314A at its opposite end. Furthermore, referring to FIG. 4, the concave portion 315 (i.e., the convex portion 316) is formed between the depression 314A and the depression 314B, as well as, between the depression 314B and the depression 314C.

FIG. 5 is a cross-sectional view along the line V-V. Referring to FIG. 5, the projection 312 has the same shape as shown in FIG. 4. The peripheral rib 317A is formed in the periphery (i.e., the flange) 313 at both ends in a direction where the plurality of projections 312 is aligned (i.e., "y" direction in FIG. 5) and communicates with the peripheral edge surface of the periphery (i.e., the flange) 313 at its one end and with the interior wall surface 314S of the depression 314A, 314C at its opposite end. As the cross-section of FIG. 5 is different from that of FIG. 4, the concave portion 315 (i.e., the convex portion 316) between the depression 314A and the depression 314B as well as the concave portion 315 (i.e., the convex portion 316) between the depression 314B and the depression 314C are not shown in FIG. 5.

FIG. 6 is a cross-sectional view of FIG. 2 along the line VI-VI. As FIG. 6 is a cross-sectional view of the region Q (or region P) of the planar portion 11, the groove-like peripheral rib 317B which is formed in the periphery (i.e., the flange) 313 of the planar portion 311 communicates with the peripheral edge surface of the periphery (i.e., the flange) 313 at its one end and does not communicate with the interior wall surface 314S of the depression 314 at the opposite end.

As in the afore-mentioned impact energy absorber 10 the periphery (i.e., the flange) 313 has a plurality of peripheral ribs 317, which extends in the direction intersecting with the circumferential direction and is arranged in the circumferential direction, the mechanical strength of the periphery (i.e., the flange) 313 is increased, and warpage which may occur in the periphery (i.e., the flange) 313 and the planar portion 311 can be avoided. Due to this, the displacement-load properties of the impact energy absorber 10 can be determined by the projection 312 and the convex portion 316, thereby attaining the desired absorbing properties.

FIG. 7 illustrates an exemplary application of the first embodiment of the impact energy absorber. Referring to FIG. 7, the impact energy absorber 10 can be coupled to, for example, a door panel 20. In other word, the impact energy absorber 10 is secured to the hollow portion between an inner panel 22 and a door trim 24 by clipping the coupling portion 318 (see FIGS. 1 and 2) to the door trim 24. Due to this, during vehicle collision, the another plate-shaped side (i.e., back side) hit against the shoulder or low back of the passenger via the door trim 24 to crush the impact energy absorber 10, thereby mitigating the impact on the passenger. Furthermore, such an impact energy absorber 10 may be preferably secured to the hollow portion between an inner panel and a roof trim in a ceiling panel.

Next, a process for forming (molding) the afore-mentioned impact energy absorber 10 will be hereinafter described. Firstly, referring to FIG. 8, an apparatus for forming (molding) an impact energy absorber 100 is provided with an extruding device for molten resin 102, a mold 116 disposed below the extruding device 102, and a mold clamping device 104 for the mold 116. The molten resin extruded by the extruding device 102 is transported to the mold clamping device 104 and can be thus molded by the mold 116 which is clamped by the mold clamping device 104.

The extruding device 102 has a cylinder 108 provided with a hopper 106, a screw (not shown) formed inside the cylinder 108, a hydraulic motor 110 coupled to the screw, an accumulator 112 internally communicating with the cylinder 108, and a plunger 114 formed inside the accumulator 112. In such a configuration, resin pellets supplied from the hopper 106 is molten and kneaded in the cylinder 108 by the rotation of the screw due to the hydraulic motor 110. The molten resin is transported into the accumulator 112. After an amount of molten resin is contained in the accumulator 112, the molten resin is transported toward a T-die 113 due to the actuation of plunger 114. The resin is extruded through a die slit (not shown) into continuous thermoplastic resin sheet P (i.e., resin material), which is then downwardly transported while being nipped by a pair of rollers 110 which is disposed apart from each other. The thermoplastic resin sheet P hangs down between a pair of divided molds 116A, 116B. Due to this, the thermoplastic resin sheet P can be arranged between the molds 116A and 116B such that is stretched without any wrinkle or loosening.

An extruding slit is perpendicularly and downwardly arranged such that the thermoplastic resin sheet extruded from the extruding slit as it is hangs down from the extruding slit and is then perpendicularly and downwardly transported. The extruding slit is made such that an interval can be modified and the thickness of the thermoplastic resin sheet P can be properly modified. Due to this, the thermoplastic resin sheet P having a desired thickness can be arranged between the molds 116A, 116B.

On the other hand, the mold clamping device 104 is provided with a mold actuating device (not shown), which is configured to move theses molds 116A, 116B between an open position and a closed position in a direction substantially perpendicular to a direction in which the thermoplastic resin sheet P is supplied. The molds 116A, 116B are disposed such that a cavity 118A is opposed to a cavity 118B. The cavities 118A, 118B are substantially perpendicularly disposed, respectively. Each surface of the cavities 118A, 118B is provided with a concave section and a convex section corresponding to the outer diameter and the outer contour of the impact energy absorber 10 which is to be formed of the molten thermoplastic resin sheet P. In other words, for example, on the surface of the cavity 118A of the mold 116A a recess 119 are formed in locations corresponding to the projection 312, the depression 315, and the peripheral rib 317 (see FIGS. 1 and 2) of the impact energy absorber 10 to be formed.

The mold 116B out of the molds 116A, 116B has a pinch-off portion 122 around the cavity 118B. The pinch-off portion 122 is annularly formed along the periphery of the cavity 118B, and projects toward the opposed mold 116A. Due to this, during the mold clamping of the molds 116A, 116B, the tip of the pinch-off portion 112 of the mold 116B abuts against the mold 116A.

The molds 116A, 116B are actuated by the mold actuating device (not shown). In the open position, the molten thermoplastic resin sheet P is disposed between the molds 116A, 116B, and then in the closed position, the annular pinch-off portion 122 of the mold 116B abuts against the mold 116A thereby forming an enclosed space inside the molds 116A, 116B.

A mold frame 120 is fit onto the outer periphery of the mold 116A in a slidable manner, and due to a mold frame moving device (not shown) a mold frame 120 is movable relative to the mold 116A. In other words, the mold frame 120 moves toward the mold 116B and abuts against one side surface of the thermoplastic resin sheet P which is arranged between the molds 116A, 116B. A vacuum suction chamber (not shown) is formed inside the mold 116A, and communicates with the cavity 118A through a suction hole (not shown). The thermoplastic resin sheet P can be adsorbed toward the cavity 118A due to the suction through the suction hole by the vacuum suction chamber. As a result, the thermoplastic resin sheet P can be formed into a shape or contour corresponding to the outer surface of the cavity 118A. A conventional known blow pin (not shown) is mounted in the mold 116 such that blow pressure is applied to the enclosed space formed by the molds 116A, 116B during the mold clamping of the mold 116.

A process for forming the impact energy absorber 10 using such an apparatus for forming an impact energy absorber 100 is hereinafter described. Firstly, as shown in FIG. 8, the thermoplastic resin contained is intermittently extruded from the extruding slit in a predetermined amount per unit of time, thereby swelling the thermoplastic resin. The molten thermoplastic resin sheet P downwardly hangs down, and is extruded in a predetermined thickness at a predetermined extrusion rate. As such, the thermoplastic resin sheet P is disposed between the molds 116A, 116B. In this case, the thermoplastic resin sheet P may be passed between a pair of rollers 115 after the extrusion and before the formation so as to crush a tubular parison to render it sheet-like.

Next, referring to FIG. 9, the mold frame 120 of the mold 116A is moved toward the thermoplastic resin sheet P to abut against the side surface of the thermoplastic resin sheet P. Due to this, the enclosed space 140 is created by the side surface of the thermoplastic resin sheet P, the inner periphery of the mold frame 120, and the cavity 118A.

Next, referring to FIG. 9, air inside the enclosed space 140 is suctioned through the suction hole by the vacuum suction chamber, thereby causing the thermoplastic resin sheet P to be adsorbed onto the cavity 118A. As a result, the thermoplastic resin sheet P is formed into the shape corresponding to the surface of the cavity 118A. For more detail, due to the recess 119 and etc. of the cavity 118A, the depression 314 is formed in one surface of the thermoplastic resin sheet P opposite to the cavity 118A, and the projection 312 which results from and reflects the depression 314 is formed in an opposite surface of the thermoplastic resin sheet P. The planar portion 311, the convex portion 316, the peripheral rib 317, and the coupling portion 318 are also formed in the opposite surface of the thermoplastic resin sheet P. See FIG. 1.

Next, referring to FIG. 11, the molds 116A, 116B are clamped, and due to the pitch-off portion 122, the periphery of the thermoplastic resin sheet P is framed.

Next, referring to FIG. 12, the mold 116A is opened to take out the molded resin article thus obtained. The burr of the outer periphery is removed to obtain the impact energy absorber 10. As described previously, the afore-mentioned steps are repeatedly carried out for intermittent extrusion of the molten thermoplastic resin to efficiently form or shape the impact energy absorber 10. Due to extrusion molding, the molten thermoplastic resin can be is intermittently extruded into the thermoplastic resin sheet P, which can be formed into a predetermined shape using the molds 116.

Second Embodiment

FIG. 13A is a perspective view of a second embodiment of an impact energy absorber from a top side, and FIG. 13B is a perspective view of the second embodiment of the impact energy absorber from a bottom side (i.e., a back side). The difference(s) between the second embodiment and the first embodiment will be mainly addressed hereinafter.

Referring to FIG. 13A, an impact energy absorber 10 has a rectangular-shaped planar portion 11 and a flange 13 which is formed in a peripheral wall 12 at the periphery of the planar portion 11. The peripheral wall 12 is formed such that the planar portion 11 is higher than the flange 13. The flange 13 extends outward from the planar portion 11, and has a plurality of (for example, three) coupling portions 14, which is intermittently formed along the outer periphery of the planar portion 11. The size of the planar portion 11 and the height of the peripheral wall 12 are adjustable depending on a location where the impact energy absorber 10 is to be placed and an expected impact load. The impact energy absorber 10 is mountable to a vehicle via the coupling portion 14.

The planar portion 11 of the impact energy absorber 10 is provided with a plurality of projections 15, for example, trapezoidal-shaped projections 15. The plurality of projections 15 extends in a short side direction of the planar portion 11 (i.e., "x" direction in FIG. 13A), and is aligned apart from each other in a longitudinal direction of the planar portion 11 (i.e., "y" direction in FIG. 13A). The planar portion 11 has two sections A, B which are divided in "x" direction. The section A has a plurality of projections 15 (i.e., projections 15A in FIG. 13A) which has substantially same length as the short side of the planar portion 11 and is aligned in "y" direction. The section B has a plurality of projections 15 (i.e., projections 15B in FIG. 13A) which is divided in a short side direction of the planar portion 11, and a single projection (i.e., a projection 15B' in FIG. 13A) which is located adjacent to and along the short side of the planar portion 11 and far shorter than the short side of the planar portion 11. The arrangement of the projections 15 having variable size in the sections A, B of the planar portion 11 can vary the degree of mitigating the impact on the passenger of the vehicle. Accordingly, the size and arrangement of the projection 15 formed in the planar portion 11 are not limited to FIG. 13A.

Referring to FIG. 13B, each projection 15 results from and reflects a deep long groove 16 which is formed in the back side of the planar portion 11. Furthermore, in FIG. 13B the projections 15A, 15B, 15B' correspond to deep long grooves 16A, 16B, 16B' respectively. Returning back to FIG. 13A, each projection 15 has a side wall portion 15S is curved or bent with respect to the planar portion 11, and a ceiling portion 15T connecting to the side wall portion at a top of the side wall portion 15S. The ceiling portion 15T is in substantially parallel to the planar portion 11.

A pair of the opposed side wall portions 15S of the projection 15 is inclined at an angle α (e.g., from 3 to 10 degrees) such it approach each other from the planar portion 11 toward the ceiling portion 15T, as shown in FIG. 14 which is a cross-sectional view of the FIG. 13A along the line II-II and FIG. 15 which is a cross-sectional view of the FIG. 13A along the line III-III. Due to this, the projection 15 is formed in a trapezoidal shape with a rectangular ceiling portion 15T. In other words, such side wall portions 15S are inclined walls. In a case where an impact load is applied diagonally to the planar portion 11, the afore-mentioned specific shape of the projection 15 can prevent the collapse of the inclined wall. Furthermore, in a case where an impact load is applied perpendicularly to the planar portion 11, the afore-mentioned specific shape of the projection 15 can prevent the ceiling portion 15T from sinking to or falling down to the planar portion 11.

While most of the projections 15 have, for example, the ceiling portion 15T and four side wall portions 15S, some of the afore-mentioned projections 15 may have, for example, the ceiling portion 15T and three side wall portions 15S.

For example, FIG. 16 is a cross-sectional view of FIG. 13A along the line IV-IV. As shown in FIG. 16, three projections 15 are aligned in "x" direction. The projections 15 at both sides except for the center projection 15 has an opening 417, which is formed by removing the side wall portion 15S at an exterior side (i.e., a side opposite to the center projection 15) out of the side wall portions 15S intersecting with the longitudinal (extending) direction of the projection 15 (i.e., "x" direction). As such, the projection 15 where a part of the side wall portion 15S (i.e., at least one of the side wall portion(s) intersecting with the longitudinal direction of the projection 15) is at least partly opened has the ceiling portion 15T and the three side wall portions 15S. The size of the opening may be properly determined.

FIG. 17A is a perspective view of FIG. 13A viewed in P direction. Referring to FIG. 17A, the projection 15B' which is disposed adjacent to the short side of the planar portion 11 has the opening 417, which is formed by removing the exterior side wall portion 15S (i.e., the side wall portion 15S at the flange 13 side) out of the side wall portions 15S parallel to the longitudinal direction of the projection 15B' (i.e., "x" direction). As such, the projection 15B' where a part of the side wall portion 15S (i.e., at least one of the side wall portions parallel to the longitudinal direction of the projection 15) is opened has the ceiling portion 15T and the three side wall portions 15S. Furthermore, while the remaining surface resulting from the removal (i.e., the periphery of the opening 417) is substantially plane with the peripheral wall 12, as shown in, for example FIG. 17A, it may not be plane with the peripheral wall 12, as shown in, for example FIG. 17B.

As such, the projection 15 in which a part of the side wall portion 15S is opened is not limited to the projections 15B, 15W as shown in FIGS. 16 and 17, and may be another projection 15.

In accordance with the afore-mentioned impact energy absorber 10, for the purpose of adjusting the displacement due to the load in, for example, a determined portion of the region B, the opening 417 is formed in a part of the side wall portion 15S of the projection 15 disposed in the predetermined portion. As most of the load applied to the ceiling portion 15T of the projection 15 is acted against by the side wall portion 15S which is disposed in a direction substantially perpendicular to the ceiling portion 15T, due to the opening 417 formed a part of the side wall portion 15S, the displacement due to the load can be adjusted. In this case, as only the opening 417 is formed in a part of the side wall portion 15S of the projection 15 which has been arranged in advance, the degree of freedom of designing or setting the projection 15 is not compromised even in a case where a plurality of the projections 15 is formed within a narrow space. In a case where the projections 15 are densely formed in the narrow space, the displacement due to the load can be adjusted by the afore-mentioned configuration, thereby attaining an advantageous effect.

Exemplary application of the afore-mentioned second embodiment of the impact energy absorber 10 is the same as the first embodiment as described previously.

The second embodiment of the impact energy absorber 10 may be generally formed in accordance with Step 1 to Step 5 of the afore-mentioned process for forming the first embodiment so that it is provided with the planar portion 11, the peripheral wall 12, the flange 13, and the coupling portion 14 (See FIGS. 13A and 13B). In this regard, FIG. 18 is a cross-sectional view of Step 1 of the process for forming the second embodiment. In FIG. 18, the mold 116 has at least four recesses 119 such that at least four projections 15 are created.

Each projection 15 of the impact energy absorber 10 thus obtained (after Step 1) has the ceiling portion 15T and the four side wall portions 15S. Next, as shown in FIG. 19 which corresponds to FIGS. 17A and 17B in the projection 15B' disposed adjacent to the short side of the section B of the planar portion 11 of the impact energy absorber 10, the exterior side wall portion 15S (i.e., the side wall portion 15S at the flange 13 side) out of the side wall portions 15S parallel to the longitudinal (extending) direction of the projection 15B' (i.e., "x" direction) is removed using a cutter, and etc. As such, the projection 15B' has the opening 417 which is formed in a part of the side wall portion 15S, and thus has the ceiling portion 15T and the three side wall portions 15S. Referring to FIG. 16, as described previously, in the projections 15B at both sides except for the center projection 15B, the side wall portion 15S at an exterior side (i.e., a side opposite to the center projection 15B) out of the side wall portions 15S intersecting with the longitudinal direction of the projection 15B (i.e., "x" direction) is removed using a cutter, and etc. As such, the projection 15B has the opening 417 which is formed in a part of the side wall portion 15S at both sides except for the center projection 15B, and thus has the ceiling portion 15T and the three side wall portions 15S.

FIG. 20 is a graph showing the relationship between the load and the displacement of the afore-mentioned impact energy absorber 10 due to the load. The abscissa axis represents the displacement (mm), and the longitudinal axis represents the load (kN).

In FIG. 20, the curve "a" represents the properties of the projection 15 (the projection of the embodiment) in which the opening 417 is formed in a part of the side wall portion 15S, and the curve "b" represents the properties of the projection (the conventional projection) in which the opening 417 is not formed in the side wall portion 15S for comparison. As is clear from FIG. 20, even if the same load is initially applied to the projection 15 and the conventional projection, a greater displacement can be attained by the projection 15 of the embodiment, in comparison with the conventional projection.

Furthermore, as is clear from FIG. 20, due to the projection 15 of the embodiment, a stable rectangular waveform can be obtained. The stable rectangular waveform means an idealistic waveform where it early reaches the predetermined load and then a constant load is maintained until the late of the displacement. To the contrary, in a case where the four side wall portion 15S are provided (the curve "b"), the load dramatically decreases. This is because the side wall portion 15S of the projection 15 may create kinks during buckling distortion, and in this case reactive force against the stress from outside is not created, which results in collapse, thereby leading to load decrease in the waveform.

Moreover, while it is not shown in FIG. 20, in a case where the four side wall portions 15S are provided, the load may dramatically increase. This is because in a case where the projections 15 are densely formed, the side wall portions 15S which are distorted during buckling distortion overlap each other and thus do not collapse even if the predetermined load is applied thereto. By creating the opening 417 to provide the projection 15 with three side wall portions 15S, a space for the buckling distortion of the side wall portion 15S can be secured, thereby preventing the side wall portions 15S from overlapping each other, and attaining stable impact absorbing properties.

Modified Version of the First Embodiment

In the first embodiment, a part of the side wall portion 15S of the projection 15 is opened by removing a part of the side wall portion 15S in each projection 15. However, the invention is not limited to the afore-mentioned embodiment. For example, referring to FIG. 21, in a case where the projection 15 to be removed is close to the flange 13, the planar portion 11, the peripheral wall 12, and the flange 13 together with the side wall portion 15S of the projection 15 to be removed may be removed such that they are separated from other planar portion 11, peripheral wall 12 and flange 13.

Modified Version of the Second Embodiment

In the first embodiment, the surface of the planar portion 11 is divided into the section A and the section B, and a part of the side wall portion 15S is opened for the projections 15 which are formed in the region B. However, the invention is not limited to the afore-mentioned embodiment. The same configuration may be applied to the projection 15 which is formed in the section A. Furthermore, the projection 15 in which a part of the side wall portion 15S is opened may be formed in either or both of the region A and the section B.

Third Embodiment

FIGS. 22A and 22B depict the configuration of a third embodiment of the impact energy absorber in accordance with the invention. FIG. 22A is a perspective view viewed from a top, and FIG. 22B is a perspective view viewed from a bottom. The following explanation will be focused on the features of the third embodiment which are different from those of the first embodiment and the second embodiment.

Referring to FIG. 22A, a plurality of trapezoidal projections extending in a short side direction (i.e., "x" direction) of the planar portion 11 of the impact energy absorber 10 is spaced apart from each other and aligned in a longitudinal direction (i.e., "y" direction in FIG. 22A) of the planar portion 11. The planar portion 11 is defined by, for example, two sections A and B in "y" direction (FIG. 22A). In the sections A and B, projections 15 with variable size (length) are mixed and arranged.

In other words, the section A has a plurality of projections 15 (i.e., projections 15a) which has substantially same length as the short side of the planar portion 11 and is aligned in "y" direction. The section B has a three short-length projections 15 (i.e., projections 15b1 in FIG. 22A), which are divided in the short side direction (i.e., "x" direction) of the planar portion 11 and disposed adjacent to the section A. The section B has two projections 15 (i.e., projections 15b2 in FIG. 22A), which are far spaced from each other in the short side direction (i.e., "x" direction) of the planar portion 11 and disposed in the middle of the section B in "y" direction. In addition, the section B has a single relatively long projection 15 (i.e., a projection 15b3 in FIG. 22A), which is disposed in the middle of section B in the short side direction (i.e., "x" direction) of the planar portion 11 and adjacent to the short side of the planar portion 11.

The reason why the projections with variable size (length) are employed is that the degree of mitigating impact on the passenger in the vehicle should be varied depending on the portion of the passenger. For the reasons, the projection 15 of the planar portion 11 is not necessarily limited to the configuration as shown in FIG. 22A.

Referring to FIG. 22B, each of the projections is formed as a result of the deep long groove 16 which is formed in the back side of the planar portion 11. Furthermore, in FIG. 22B, the projections 15a, 15b1, 15b2, 15b3 correspond to the deep long grooves 16a, 16b1, 16b2, 16b3, respectively. Returning to FIG. 22A, each of the projections 15 has the side wall portion 15S which is bent with respect to the planar portion 11 and the ceiling portion 15T connecting to the top of the side wall portion 15S. The ceiling portion 15T is substantially parallel to the planar portion 11.

With regard to each of the side wall portions 15S of the projection 15, the cross sectional view of FIG. 22A along the line II-II and the cross-sectional view of FIG. 22A along the line III-III are similar to FIGS. 14 and 15 with respect to the second embodiment, respectively. As shown in FIGS. 14 and 15, a pair of the opposed side wall portions 15S is inclined at an angle α (an angle of from 3 to 10 degrees) in a direction of approaching each other as it gets away from the planar portion 11 and close to the ceiling portion 15T. In other words, the pair of opposed side wall portions 15S is an inclined wall Due to this, the projection 15 is formed in a trapezoidal shape with the rectangular ceiling portion 15T. When an impact load is applied to the planar portion 11 in a trigonal direction, such a projection 15 can prevent can prevent the collapse of the inclined wall. Also, when the impact load is perpendicularly applied to the planar portion 11, such a projection 15 can prevent the ceiling portion 15T from sinking to or falling down to the planar portion 11. Furthermore, as shown in FIGS. 22A and 22B, each of the projections 15a formed in the section A is not provided with a rib which will be described below. In other words, the surface and back side of the side wall portion 15S is flat.

Furthermore, referring to FIGS. 22A and 22B, the projection 15 which is formed in the section B of the impact energy absorber 10 has a side wall rib 517, which is formed in a part of the side wall portion 15S and extends from the planar portion 11 toward the ceiling portion 15T in a direction perpendicular to the planar portion 11.

FIG. 23A is an enlarged perspective view of one of the projections 15b1 as shown in FIG. 22A. Referring to FIG. 23A, the side wall rib 517 projects from one surface of the side wall portion 15S, and extends from the planar portion 11 to the ceiling portion 15T in a direction perpendicular to the planar portion 11. Furthermore, referring to FIG. 23B which is a cross-sectional view of FIG. 23A along the line b-b, the side wall rib 517 has a triangular cross-section.

FIG. 24 is an enlarged perspective view of one of the projections 15b2 as shown in FIG. 22A. Referring to FIG. 24, the side wall rib 517 projects from one surface of the side wall portion 15S, and extends from the planar portion 11 toward the ceiling portion 15T in a direction perpendicular to the planar portion 11. In this case, the extending end of the side wall rib 517 is positioned at H, an extent of from 50% (½) to 80% of the distance "H" from the planar portion 11 to the ceiling portion 15T.

Furthermore, FIG. 25 is an enlarged perspective view of the projection 15b3 as shown in FIG. 22A. Referring to FIG. 25, the rib as shown in FIG. 23A, the extending end of which reaches the ceiling portion 15T and the rib as shown in FIG. 24, the extending end of which does not reach the ceiling portion 15T as the side wall rib 517 are aligned.

Furthermore, the projection 15 with the side wall rib 517 is not limited to the configuration as shown in FIGS. 22A and 22B, and the side wall ribs 517 which are formed in the same projection 15 may be three or more. Furthermore, while the side wall rib 517 as shown in FIGS. 22A and 22B is formed in the side wall portion 15S parallel to the longitudinal direction of the projection 15, the invention is not limited thereto. The side wall rib 517 may be formed in the side wall portion 15S intersecting with the longitudinal direction of the projection 15.

Furthermore, the side wall rib 517 of the projection 15 may be recessed relative to the surface of the side wall portion 15S, as shown in FIG. 26A which corresponds to FIG. 23B. The cross-section of the side wall rib 517 may be semicircular, as shown in FIGS. 26B and 26C.

FIG. 27 is a graph showing the relationship between the load and the displacement of the afore-mentioned impact energy absorber 10 due to the load, compared with the comparative example. The abscissa axis represents the displacement (mm), and the longitudinal axis represents the load (kN).

In FIG. 27, the curve "a" represents the properties of the impact energy absorber in accordance with the embodiment of the invention where the rib formed in the side wall portion of the projection extends from the planar portion to the ceiling portion. The curve "b" represents the properties of the impact energy absorber in accordance with the embodiment of the invention where the rib formed in the side wall portion of the projection extends from the planar portion to the extent of from 50% to 80% of the distance between the planar portion and the ceiling portion. Furthermore, the curve "c" represents the properties of the impact energy absorber where no rib is formed in the side wall portion of the projection. In other words, the curve "c" represents the properties of the impact energy absorber which does not belong to the scope of the invention.

As is clear from the comparison with the curve "c", the curve "a" shows that the load is totally increased in the first half. The curve "b" shows that idealistic waveform (i.e., the rectangular waveform) that after the load is raised to the predetermined level, the state of displacement with a constant load is maintained until the last half. In other word, in a case where in the impact energy absorber without the rib which is formed in the side wall portion of the projection the load in the specified displacement is lower than a desired value, by adopting the rib extending from the planar portion to the location corresponding to the displacement where the load is decreased, the decrease of load in the specified displacement (amount) can be suppressed, thereby attaining the impact energy absorber with desired impact absorbing properties.

Exemplary application of the afore-mentioned third embodiment of the impact energy absorber 10 is the same as the first and second embodiments as described previously.

The third embodiment of the impact energy absorber 10 may be formed in accordance with Step 1 to Step 5 of the afore-mentioned process for forming the first and second embodiment so that it has the planar portion 11, the peripheral wall 12, the flange 13, and the coupling portion 14 (See FIGS. 22A and 22B).

The third embodiment is different from the first and second embodiments in following points: when the side wall rib 517 is intended to be formed in the side wall portion 15S of the projection 15 of the impact energy absorber 10, as shown in FIG. 22A, the mold clamping device 104 is configured such that a notch 150 for the formation of the side wall rib 517 (see FIGS. 22A and 22B) is formed in the inner surface 119S of the depression 119 which corresponds to the projection 15 and extends from the opened portion of the depression 119 halfway to the bottom 119B of the depression 119, as shown in FIG. 28. Due to this, the side wall rib 517 (see FIGS. 22A and 22B) can be formed in the side wall portions 15S of several projections 15 among the projections 15. Furthermore, after the impact energy absorber 10 is formed by using the mold 116, even if the displacement-load properties of the projection 15 is not desirably attained, the extending end of the notch 150 can be reduced to adjust the length of the notch 150, as indicated by a dotted line in FIG. 28 and then the impact energy absorber 10 can be formed again. Due to this, the length of the side wall rib 517 (FIGS. 22A and 22B) which is formed in the side wall portion 15S of the projection 15 can be optimized, thereby attaining the projection 15 with a desired displacement-load properties.

Modified Version of the Third Embodiment

In the third embodiment, the side wall rib 517 is not formed in one surface of the side wall portion 15S of the projection 15 which is disposed in the section A. However, the invention is not limited to the afore-mentioned embodiment. As shown in FIG. 29, the side wall rib 517 may be formed in the side wall portion 15S of the projection 15 disposed in the section A and adjacent to the section B. The projection 15 with the side wall rib 517 may be arbitrarily selected and the number of the side wall ribs 517 formed in the selected projection 15 may be arbitrarily determined.

Fourth Embodiment

FIGS. 30A and 30B depicts the configuration of the fourth embodiment of the impact energy absorber in accordance with the invention. FIG. 30A is a perspective view viewed from a top and FIG. 30B is a perspective view viewed from a bottom (back side). The following explanation will be focused on the features of the fourth embodiment which are different from those of the first, second, and third embodiments.

Referring to FIG. 30A, each projection 15a which is formed in the section A has a height $T_0$ from the planar portion 11 to the ceiling portion 15T in whole, as shown in FIGS. 31 and 32.

While most of such projections 15 have the height $T_0$ from the planar portion 11 to the ceiling portion 15T, some projections 15 have the height of from the planar portion 11 to the ceiling portion 15T less than the height $T_0$.

For example, referring to FIG. 33 which is a cross-sectional view of FIG. 30A along the line IV-IV, three projections 15b1 adjacent to the section A out of the projections 15B formed in the section B are aligned in a short side direction of the planar portion 11 (i.e., "x" direction). These three projections 15b1 are formed such that they have heights (i.e., the height from the planar portion 11 to the ceiling portion 15T) $T_1$ ($<T_0$), $T_0$, and $T_2$ ($<T_0$) in order from one side to opposite side. In other words, the center projection 15B with the height $T_0$ is highest, and the both side projections 15B have the heights $T_1$, $T_2$ which are less than the height $T_0$ of the center projection 15B. In this regard, the heights $T_1$, $T_2$ may be same as or different from each other. Similarly, as shown in FIG. 34 which is a cross-sectional view of the FIG. 30A along the line V-V, two projections 15b2 is disposed in the middle of the section B in "y" direction and far apart from each other in a "x" direction. The two projections 15b2 have the heights from the planar portion 11 to the ceiling portion 15T, $T_3$ ($<T_0$) and $T_4$ ($<T_0$) in order from one side to opposite side. In this regard, the heights $T_3$ and $T_4$ may be same as or different from each other, and may be equal to either of the heights $T_1$ or $T_2$. Furthermore, a single, a relative long projection 15b3 adjacent to the flange 13 out of the projections 15 of the section B is centrally located in "x" direction, as shown in FIG. 35 which is a cross-sectional view of the FIG. 30A along the line VI-VI. The projection 15b3 has the height $T_0$ from the planar portion 11 to the ceiling portion 15T.

The projection 15 having the height less than $T_0$ is not limited to the afore-mentioned projection 15, and may be another projection 15.

In accordance with the afore-mentioned impact energy absorber 10, in order to adjust the displacement due to the load in the predetermined area of the section B, the height of the projection 15 (i.e., the height from the planar portion 11 to the ceiling portion 15T) disposed therein is made less than the height $T_0$. For example, the height of the projection 15 disposed therein may be $T_1$, $T_2$, $T_3$, $T_4$ and etc. As most of the load applied to the ceiling portion 15T of the projection 15 is acted against the side wall portion 15S which is disposed in a direction substantially perpendicular to the ceiling portion 15T, the displacement due to the load can be adjusted by the control of the height of the side wall portion 15S. In this case, only the height of the side wall portion 15S which has been disposed in advance is controlled or adjusted, and the freedom of designing or setting the projection 15 even formed in a narrow space is thus not compromised. For the above reasons, in a case where the projections 15 are densely formed in a narrow space, a great effect of adjustment of the displacement due to the load can be attained by adopting the afore-mentioned configuration.

It has been ascertained that it is effective that the height (for example, $T_1$, $T_2$, $T_3$, $T_4$ and etc.) of the projection 15 for the adjustment of the displacement due to the load is in a range of from 60% to 95% of the height $T_0$ of the highest projection 15, preferably from 80% to 86% of the height $T_0$.

Referring to FIG. 36, the lengths of the projections 15 which are formed in the impact energy absorber 10 (see FIG. 30A) are indicated by W1, W2, W3, W4 . . . Wn in order in a direction from the projection 15b3 which is adjacent to one short side of the planar portion 11 (i.e., an upper edge in FIG. 36) to the projection 15a which is adjacent to an opposite short side of the planar portion 11 (i.e., a lower edge in FIG. 36). The projections 15 may have the same length.

Referring to FIG. 36, the lower projections 15 have lengths W2, W3, W4, W6, and the highest projections 15 have lengths W1, W5, W7, W8, . . . Wn. In this case, the value determined by the following formula (1) is within a range of from 0.05 to 0.2.

$$(W2+W3+W4+W6)/(W1+W5+W7+W8+\ldots+Wn) \qquad (1)$$

In other words, the ratio of the sum of the lengths of the lower projections 15 to the sum of the lengths of the highest projections 15 (W1+W5+W7+W8+ . . . +Wn) is a range of from 5% to 20%. In this case, it is ascertained that the value of from 7% to 13% is more effective.

FIG. 37 is a graph showing the relationship between the load and the displacement of the afore-mentioned impact energy absorber 10 due to the load, compared with the comparative example. The abscissa axis represents the displacement (mm), and the longitudinal axis represents the load (kN).

In FIG. 37, the curve "a" represents the properties of the impact energy absorber to which the embodiment of the invention is applied. In other words, the impact energy absorber is formed such that in the ceiling portion 15T of each projection 15, the height of the lower portion is 80% of the height of the higher portion, and the length of the lower portion to the total length of each projection 15 is 13%. The above values are adopted in terms of effect. As a result, the curve "a" is ascertained to attain an idealistic waveform where a predetermined load is early reached and the state of the displacement with a constant load is maintained until the last half. To the contrary, the curve "b" where the invention is not applied represents the properties of the impact energy absorber where the projection of the height $T_0$ is formed, and no lower projection 15 is formed. As a result, the curve "b" early has a great load to the displacement, and then the dramatic load decrease. Accordingly, a constant load cannot be maintained with respect to great displacement.

In FIG. 37, the curve "c" represents the properties of the impact energy absorber, where in the ceiling portion 15T of each projection 15, the height of the lower portion is 55% of the height of the higher portion, and the length of the lower portion to the total length of each projection 15 is 13%. In this case, it is ascertained that the load become excessively low in the first half, and excessively high in the last half.

Furthermore, the curve "d" represents the properties of the impact energy absorber, where in the ceiling portion 15T of each projection 15, the height of the lower portion is 80% of the height of the higher portion, and the length of the lower portion to the total length of each projection 15 is 42%. In this case, it is ascertained that the early load becomes excessively low Due to this, either of the curves "c" and "d" fails to attain properties of flat load with respect to the displacement.

Exemplary application of the afore-mentioned fourth embodiment of the impact energy absorber 10 is the same as the first, second, and third embodiments as described previously.

The fourth embodiment of the impact energy absorber 10 may be formed in accordance with Step 1 to Step 5 of the afore-mentioned process for forming the first, second, and third embodiments of the impact energy absorber 10 so that it has the planar portion 11, the peripheral wall 12, the flange 13, and the coupling portion 14 (See FIGS. 30A and 30B). In this regard, FIG. 38 is a cross-sectional view of Step 1 of the process for forming the fourth embodiment. In FIG. 38, the mold 116 has at least four recesses 119 such that at least four projections 15 are created. The recesses 119 have the depths corresponding to the heights of the corresponding projections 15 (i.e., $T_0$, $T_1$, $T_2$, $T_3$, $T_4$ and etc.).

Modified Version of Fourth Embodiment

In the fourth embodiment, at least one of the plurality of projection 15 has the height thereof to the ceiling portion 15T less than the height of other projection(s) 15 to the ceiling portion 15T. However, the invention is not limited to the afore-mentioned embodiment. In at least one projection 15, a part of the ceiling portion 15T may be lower than the other remaining part of the ceiling portion 15T.

FIGS. 39A and 39B depict a configuration of an impact energy absorber 10' provided with a projection 15 in which a part of the ceiling portion 15T is lower than the other remaining part of the ceiling portion 15T. FIG. 39A corresponds to FIG. 30A, and the configuration as shown in FIG. 30A is further provided with a projection 15a0 which is one of the projections 15 formed in the section A, and disposed adjacent to the section B.

As shown in FIG. 39B which is a cross-sectional view of FIG. 39A along the line b-b, the projection 15a0 has the height $T_5$ of from the planar portion 11 to the ceiling portion 15T in the center portion thereof, which is less than the height $T_0$ of from the planar portion 11 to the ceiling portion 15T in both sides. In this case, $T_5$ may be different from $T_1$, $T_2$, $T_3$, and $T_4$, and same as any of $T_1$, $T_2$, $T_3$, and $T_4$. Furthermore, the location and the number of the projection (s) 15 having the part of the ceiling portion 15T lower than other part of the ceiling portion 15T are not limited to those as shown in FIGS. 39A and 39B.

Furthermore, as described previously in connection with the fourth embodiment, even in the modified version of the fourth embodiment, the lower ceiling portion 15T of the projection 15 is preferably located at an extent of from 60% to 95% of the height $T_0$ of the higher ceiling portion 15T. The ratio of the length of the portion of the projection 15 with the lower ceiling portion 15T to the length of the portion of the projection 15 with the highest ceiling portion 15T is preferably within a range of from 5% to 20%.

While a preferred embodiment of the present invention has been shown and described with particularity, it will be appreciated that various changes and modifications may suggest themselves to one having ordinary skill in the art upon being apprised of the present invention. It is also intended to encompass all such changes and modifications as fall within the scope and spirit of the appended claims.

REFERENCE SIGNS LIST

Reference Signs Common in the First Embodiment to Fourth Embodiment

10 impact energy absorber
20 door panel
22 inner panel
24 door trim
100 apparatus for forming an impact energy absorber
102 extruding device
104 mold clamping device
106 hopper
108 cylinder
110 hydraulic motor
112 accumulator
113 T die
114 plunger
115 roller
116 mold
119 recess
120 mold frame
122 pinch off portion
140 enclosed space
P thermoplastic resin sheet Reference Signs Common in the Second Embodiment to Fourth Embodiment

11 planar portion
12 peripheral wall
13 flange
14 coupling portion
15 projection
15S side wall portion
15T ceiling portion
16 deep long groove First Embodiment

311 planar portion
312 projection
312T ceiling portion
312S exterior wall surface
313 periphery (flange)
314 depression
314S interior wall surface
315 concave portion
316 convex portion
317 peripheral rib
318 coupling portion Second Embodiment

417 opening

Third Embodiment

517 side wall rib

The invention claimed is:

1. An impact energy absorber for a vehicle produced by a formation of a plate-shaped resin material, the impact energy absorber comprising:
   a planar portion including a periphery;
   a plurality of projections projecting from the planar portion, each projection of the plurality of projections having a ceiling surface with a substantially elongated-shape and having a first set of walls connecting each edge of the ceiling surface with the planer portion, the first set of walls of each projection of the plurality of projections each having an inner surface and an outer surface, and the inner surfaces of the first set of walls of each projection forming a depression;
   a plurality of groove-shaped peripheral ribs, each of the plurality of groove-shaped peripheral ribs being arranged along the periphery of the planar portion and having a concave shape that projects in a same direction as the plurality of projections; and at least one concave portion including a second set of walls projecting in the same direction as the plurality of projections, an inner surface of the second set of walls forming the concave portion and an outer surface of the second set of walls forming a convex portion, a depth of the concave portion being less than a depth of the depression of each of the plurality of projections, wherein:

the planar portion includes at least one connecting region disposed between adjacent projections of the plurality of projections, and the periphery and the connecting region are distinct from one another; and the at least one concave portion is formed in at least part of the at least one connecting region.

2. The impact energy absorber according to claim 1, wherein at least one of the plurality of groove-shaped peripheral ribs communicates with a peripheral edge surface of the periphery.

3. The impact energy absorber according to claim 1, wherein at least one of the plurality of groove-shaped peripheral ribs communicates with the inner wall surface of the depression.

4. The impact energy absorber according to claim 1, wherein at least one of the plurality of groove-shaped peripheral ribs has a depth less than the depth of the at least one concave portion.

5. The impact energy absorber according to claim 1, further comprising at least one coupling portion configured to operationally couple the impact energy absorber to a trim of the vehicle in such a manner that the plurality of projections project outward substantially orthogonally from the trim.

6. The impact energy absorber according to claim 1, wherein the plurality of projections project in a direction substantially orthogonal to the planer portion.

7. The impact energy absorber according to claim 1, wherein the plurality of projections are arranged solely within the planar portion.

8. The impact energy absorber according to claim 1, wherein the at least one concave portion is a plurality of concave portions, at least one of the plurality of concave portion has the first set of walls and the ceiling surface corresponding with each projection form a truncated quadrilateral pyramid such that a smaller base of the truncated quadrilateral pyramid corresponds to the ceiling surface.

9. The impact energy absorber according to claim 1, wherein the plurality of projections each have substantially a same length and volume with respect to one another and are arranged so that elongated sides of the plurality of projections are aligned.

10. The impact energy absorber according to claim 1, wherein a plurality of concave portions, which includes the at least one concave portion, are formed in the at least one connecting region.

11. The impact energy absorber according to claim 1, wherein the outer surface of the first set of walls is inclined at an angle α of between 3 to 10 degrees from the direction in which the projection projects.

12. The impact energy absorber according to claim 5, wherein at least a portion of one of the groove-shaped peripheral ribs is formed in the coupling portion.

* * * * *